United States Patent
Kimoto et al.

(10) Patent No.: US 9,096,269 B2
(45) Date of Patent: Aug. 4, 2015

(54) STRUCTURE FOR PASSENGER VEHICLE INTERIOR, AND MANUFACTURING METHOD THEREFOR

(75) Inventors: Yukitane Kimoto, Nagoya (JP); Toshihide Sekido, Nagoya (JP); Nobuhiko Shimizu, Nagoya (JP); Toru Yamanaka, Nagoya (JP); Kosaku Hashimoto, Nagoya (JP); Yoshito Kuroda, Nagoya (JP); Takao Sano, Otsu (JP); Hiroki Wakabayashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 111 days.

(21) Appl. No.: 13/820,877

(22) PCT Filed: Sep. 1, 2011

(86) PCT No.: PCT/JP2011/069899
§ 371 (c)(1),
(2), (4) Date: May 17, 2013

(87) PCT Pub. No.: WO2012/033000
PCT Pub. Date: Mar. 15, 2012

(65) Prior Publication Data
US 2013/0249242 A1    Sep. 26, 2013

(30) Foreign Application Priority Data

Sep. 6, 2010 (JP) ................................ 2010-199091
Sep. 6, 2010 (JP) ................................ 2010-199092
Oct. 15, 2010 (JP) ................................ 2010-232509

(51) Int. Cl.
*B62D 25/00* (2006.01)
*B62D 29/04* (2006.01)
(Continued)

(52) U.S. Cl.
CPC ................ *B62D 29/04* (2013.01); *B29C 33/42* (2013.01); *B62D 25/2009* (2013.01); *B62D 29/046* (2013.01); *B62D 31/003* (2013.01)

(58) Field of Classification Search
CPC ...... B62D 23/00; B62D 23/005; B62D 25/20; B62D 25/2009; B62D 25/2018; B62D 25/2027; B62D 25/2036; B62D 29/04; B62D 29/041; B62D 29/043; B62D 29/046
USPC .......... 296/181.1, 181.2, 193.07, 203.01, 204
See application file for complete search history.

(56) References Cited

U.S. PATENT DOCUMENTS 4,521,049 A * 6/1985 Genma et al. ............... 296/181.2
5,975,625 A * 11/1999 Simplicean ................... 296/205

(Continued)

FOREIGN PATENT DOCUMENTS

JP    57-84270 A    5/1982
JP    61-98655 A    5/1986

(Continued)

OTHER PUBLICATIONS

International Search Report dated Dec. 13, 2011, application No. PCT/JP2011/069899.

*Primary Examiner* — Gregory Blankenship
(74) *Attorney, Agent, or Firm* — RatnerPrestia

(57) ABSTRACT

A structure for a passenger vehicle interior is a structure for constituting the vehicle interior of a passenger vehicle, is formed in a monocoque structure in which the entire structure from the front side to the rear side of the vehicle interior is integrally formed by a fiber-reinforced resin, has a bowl-shaped structure part which is provided at least on the front side among the front side and the rear side of the structure and which opens toward the rear side, and has a side-wall part formed as a vertical wall that is continuous with the bowl-shaped structure part and extends in a front-rear direction of the structure, at each of both side parts of the structure, and a manufacturing method therefor.

24 Claims, 13 Drawing Sheets

(51) Int. Cl.
*B62D 25/20* (2006.01)
*B62D 31/00* (2006.01)
*B29C 33/42* (2006.01)

(56) References Cited

U.S. PATENT DOCUMENTS

| | | | |
|---|---|---|---|
| 7,140,667 B2 * | 11/2006 | Steinhauser et al. | 296/181.2 |
| 8,544,585 B2 * | 10/2013 | Ballard | 180/89.1 |
| 8,882,183 B2 * | 11/2014 | Suzuki et al. | 296/203.01 |
| 2012/0024612 A1 * | 2/2012 | Ballard | 180/211 |
| 2012/0104793 A1 * | 5/2012 | Danielson et al. | 296/181.1 |
| 2012/0126580 A1 * | 5/2012 | Gandini | 296/193.07 |
| 2013/0249242 A1 * | 9/2013 | Kimoto et al. | 296/181.2 |
| 2013/0313862 A1 * | 11/2013 | Yamaji et al. | 296/203.01 |
| 2013/0313863 A1 * | 11/2013 | Yamaji et al. | 296/203.01 |
| 2014/0239546 A1 * | 8/2014 | Santoni | 264/265 |
| 2014/0300141 A1 * | 10/2014 | Hihara et al. | 296/193.07 |
| 2014/0319874 A1 * | 10/2014 | Matsuda | 296/187.12 |

FOREIGN PATENT DOCUMENTS

| | | |
|---|---|---|
| JP | 64-32982 A | 2/1989 |
| JP | 1-182175 A | 7/1989 |
| JP | 5-78676 | 10/1993 |
| JP | 7-52837 A | 2/1995 |
| JP | 8-108747 A | 4/1996 |
| JP | 9-286348 A | 11/1997 |
| JP | 2010-023706 A | 2/2010 |

* cited by examiner

Front ←——————→ Rear

STRUCTURE FOR PASSENGER VEHICLE INTERIOR, AND MANUFACTURING METHOD THEREFOR

CROSS REFERENCE TO RELATED APPLICATIONS

This is the U.S. National Phase application of PCT/JP2011/069899, filed Sep. 1, 2011, which claims priority to Japanese Patent Application Nos. 2010-199092, filed Sep. 6, 2010, 2010-199091, filed Sep. 6, 2010, and 2010-232509, filed Oct. 15, 2010, the disclosures of these applications being incorporated herein by reference in their entireties for all purposes.

TECHNICAL FIELD OF THE INVENTION

The present invention relates to a structure for a vehicle interior of a passenger vehicle (excluding a racing car) and a manufacturing method thereof, and specifically, to a structure for a passenger vehicle interior suitable for an electric vehicle or a hybrid car substantially the whole of which can be formed integrally, and a manufacturing method thereof.

BACKGROUND OF THE INVENTION

In an electric vehicle, a fuel cell powered vehicle, a hybrid car, etc., it is possible to use an electric motor as a power source for running a vehicle, and from the point of high design freedom of the electric motor for being mounted on the vehicle, freedom for designing a vehicle body is greatly increased. Therefore, the freedom in shape or structure of a structural body for a vehicle interior is also increased greatly. Further, such a vehicle capable of using an electric motor as a power source for running the vehicle is little in exhaust of carbon dioxide synthetically, and is paid attention to as a global environment adaptable-type vehicle. In particular, recently, a concept of LCA (Life Cycle Assessment) is also taken into consideration, and reduction of the amount of exhaust of carbon dioxide all over the life of a vehicle including its material from the stage of manufacture of the vehicle, through the term of use of the vehicle, up to scrapping of the vehicle, is being estimated.

On the other hand, for a vehicle, as fundamentally required specifications, a structure for ensuring safety of a passenger at the time of collision and the like, lightening in weight of a vehicle body for improving fuel consumption and the like, and excellent mass productivity and reduction in cost for manufacture, etc. are required. As a structure for improving safety of a passenger, for example, a design concept is paid attention to wherein it is preferred to employ a rigid structure capable of suppressing a deformation as little as possible for a vehicle interior which is a space for residence of a passenger, and to employ a soft structure (also called as a crushable structure) for absorbing an impact from outside at the time of collision (collision at front side and collision at rear side, etc.) and the like effectively and suppressing influence to the vehicle interior as little as possible for vehicle front part or rear part connected to a vehicle interior structure part. Further, in order to ensure safety of a passenger, also required is a design for suppressing influence due to an impact load from outside, at the time of rolling over and the like, to a vehicle interior as little as possible.

As a structure for ensuring safety of a passenger at the time of collision and the like including lightening in weight of a vehicle body, for example, a structure is proposed wherein a vehicle body structural part is formed by a fiber-reinforced resin (for example, Patent document 1). In this structure disclosed in Patent document 1, a vehicle body structural part forming a lower part of a vehicle body and a vehicle interior part are formed independently from each other, and the vehicle body structural part is formed by a fiber-reinforced composite material to give an impact energy absorbing function thereto.

In this structure disclosed in Patent document 1, however, because the vehicle body structural part and the vehicle interior part are formed independently from each other, there is a limit in the productivity, particularly in the mass productivity. Therefore, it is not a structure remarkably advantageous for reducing the cost for manufacture. Further, although a device on structure for absorbing an impact energy is added for the vehicle body structural part positioned at a lower part of the vehicle interior part, a device for improving safety of a passenger, such as a rigid structure capable of suppressing deformation as little as possible, is not taken care of for the vehicle interior part. Namely, although the care for ensuring the safety by absorbing an impact energy by the vehicle body structural part is taken for a passenger in the vehicle interior, the structure is not considered to be a structure taken care of sufficiently from the viewpoint of ensuring safety of a passenger by suppressing deformation of the vehicle interior or suppressing transmission of a load into the vehicle interior from outside. Further, if a vehicle interior structural part is attempted to be reinforced in a usual metal vehicle body, it takes much time for assembly of reinforcement parts or bonding due to welding and the like, and a continuity due to molding such as that in a fiber-reinforced resin cannot be expected, and therefore, lightening in weight is difficult.

PATENT DOCUMENTS

Patent document 1: JP-A-2010-23706

SUMMARY OF THE INVENTION

As described above, although a structure is known wherein a fiber-reinforced resin is used for a vehicle body structural part positioned at a lower part of a vehicle interior part (a lower part base portion) and its feature is utilized, a structure considering the whole of the part including a vehicle interior structural part and a lower part base portion synthetically particularly from the viewpoint of improving safety of a passenger in a vehicle interior is not known.

Accordingly, the present invention provides a structure for a vehicle interior of a passenger vehicle which can achieve an excellent rigid structure for forming a vehicle interior for ensuring safety of a passenger, and can have an excellent mass productivity and reduce the cost for manufacture by realizing facilitation of integral molding, based on a novel concept synthetically considering a vehicle interior structural part as a part including a lower vehicle base part and also considering increase of freedom for designing a vehicle interior in a vehicle capable of using an electric motor as a power source, and a manufacturing method thereof.

A structure for a passenger vehicle interior according to an exemplary embodiment of the present invention, which is a structure for constituting the vehicle interior of a passenger vehicle, is characterized in that the structure is formed in a monocoque structure in which the entire structure from a front side to a rear side of the vehicle interior is integrally formed by a fiber-reinforced resin, the structure has a bowl-shaped structure part which is provided at least on the front side among the front side and the rear side of the structure and which opens toward the rear side, and has a side-wall part formed as a vertical wall that is continuous with the bowl-shaped structure part and extends in a front-rear direction of the structure, at each of both side parts of the structure. Where, in the present invention, a so-called passenger vehicle is a target, and because it may be difficult in some circumstances to apply the present invention to a monocoque structure of a racing car in which an opening part for getting on and off of a passenger is very small, it is less preferred as a target of the present invention. Further, the above-described bowl-shaped structure part means a concept including a bowl-shaped structure part having any shape which opens toward a front-rear direction of the structure (front-rear direction of the vehicle) such as a semi-open dome shape or a square-type bowl-like shape.

In such a structure for a passenger vehicle interior according to the present invention, by providing the bowl-shaped structure part and the side-wall parts to the structure for the vehicle interior, it becomes possible to form the whole of a main structural part for forming the vehicle interior as a monocoque structure and form it integrally by a fiber-reinforced resin. Namely, as compared with the conventional structure aforementioned, it becomes a formation of a structure for a passenger vehicle interior wherein a portion including a vehicle interior structural part and a vehicle base part located at a position of the vehicle interior structural part is integrally formed, and from the point that these parts are all formed integrally, it is a structure formation based on a new concept basically different from the conventional technology. For a usual sedan-type vehicle, as the above-described bowl-shaped structure part, both of a front bowl-shaped structure part opening toward the rear side and a rear bowl-shaped structure part opening toward the front side are provided, and for a part of types of vehicles such as a hatchback type, a structure having only a front bowl-shaped structure part is possible. With respect to such a bowl-shaped structure part, as long as a structure for removing a mold at the time of molding is ensured, it becomes possible to mold the whole of the structure for a vehicle interior integrally. By making the whole of the structure for a passenger vehicle interior, formed by a fiber-reinforced resin, as a monocoque structure, while lightening in weight can be achieved, a rigidity required all over the vehicle interior structural part can be easily ensured, and by achieving the rigidity necessary for the vehicle interior, safety for a passenger can be improved. Further, in case where at least a part of this monocoque structure is formed as a sandwich structure having a skin of fiber-reinforced resin, a structure more lightened in weight and made more rigid can be obtained. Moreover, because this structure for a passenger vehicle interior is formed in a monocoque structure including a vehicle base part located at a lower position of the vehicle interior, it becomes possible to integrally mold the whole thereof, the number of parts becomes extremely few and the manufacture thereof can be facilitated, and an excellent productivity, in particular, an excellent mass productivity, can be obtained as well as reduction of cost for manufacture becomes possible. Furthermore, as aforementioned, in a vehicle capable of using an electric motor as a power source, the freedom for designing a vehicle body greatly increases, this advantage can be reflected to the design freedom for the monocoque structure, and simplification of the monocoque structure, simplification of the shape, facilitation of removal form mold at molding, etc., become possible, and therefore, a further improvement of the productivity may become possible.

In the above-described structure for a passenger vehicle interior according to the present invention, as described above, a bowl-shaped structure part, which opens toward the front side, can be provided also on the rear side of the structure.

Further, in the above-described structure for a passenger vehicle interior according to the present invention, in particular, it is preferred that a keel formed as a vertical wall and extending in the front-rear direction of the structure at least partially is provided in a section of the structure including at least the above-described bowl-shaped structure part (a front bowl-shaped structure part, or a front bowl-shaped structure part and a rear bowl-shaped structure part). The keel may be a single one, and as needed, two or more ones may be provided. By providing such a keel, the section including at least the bowl-shaped structure part of the structure is reinforced, and the strength and the rigidity of the section can be greatly increased. Therefore, a rigidity as the whole of the structure for a passenger vehicle interior, in particular, for achieving a rigid structure required for the vehicle interior, can be ensured.

In particular, it is preferred that the above-described keel is formed in the bowl-shaped structure part as a vertical wall extending from a bottom surface to a ceiling surface of the bowl-shaped structure part. In such a keel structure, the bowl-shaped structure part can be reinforced more securely, and the strength and rigidity of the bowl-shaped structure part, ultimately, the strength and rigidity of the whole of the structure, can be increased more securely.

Further, in the above-described structure for a passenger vehicle interior according to the present invention, it is preferred that a rib extending in a width direction of the structure (that is, in the width direction of the vehicle) is provided in the structure. Although the rib may extend partially in the width direction of the structure, preferably it extends substantially over the entire width (namely, all over the portion between both side-wall parts, or all over the portion between both walls of the bowl-shaped structure part located at both positions in the width direction of the structure). Further, this rib also may be a single one, and as needed, two or more ones may be provided. Further, the extending direction of the rib may be substantially the width direction of the structure, and of course, it may be the direction perpendicular to the front-rear direction, and it may be a direction obliquely extending relative to the perpendicular direction. By providing such a rib, the strength and rigidity of the structure in a direction across the above-described keel, particularly the rigidity against twist of the whole of the structure can be increased, and a rigid structure required for the vehicle interior can be achieved more securely. This rib is preferably provided at a central portion of the side-wall part in the front-rear direction of the structure, and further preferably, provided on the opening part of the bowl-shaped structure part so as to extend along at least a part of the opening edge of the bowl-shaped structure part.

Further, in the above-described structure for a passenger vehicle interior according to the present invention, it is preferred that, at least on an upper edge part of the side-wall part among an opening edge part of a structure opening part opened upwardly which is formed by an opening edge part of the bowl-shaped structure part and the upper edge part of the side-wall part that is continuous with the opening edge part of the bowl-shaped structure part, a gunnel extending along the opening edge part of the structure opening part is provided. This gunnel functions for reinforcing the strength and rigidity of the opening edge part, and therethrough, it functions for increasing the strength and rigidity of the whole of the structure more securely. Moreover, in this structure, it is preferred that the opening edge part of the structure opening part is formed in a shape capable of going in and out with a cone mold used for molding of the structure. In such a structure, when the structure is molded, attachment and detachment of the cone mold can be easily carried out, and the molding of the structure can be facilitated. Where, the cross-sectional shapes of the above-described keel, rib and gunnel themselves are not particularly restricted, and various sectional shapes can be employed. For example, various sectional shapes, except a simple flat-plate type vertical wall or lateral wall shape, such as I-shaped, T-shaped, L-shaped, reverse L-shaped, Z-shaped and hat-shaped forms, can be employed. The above-described keel, rib or gunnel can be formed as a sandwich structure and the like having a skin composed of a metal, a resin (including a fiber-reinforced resin) or a fiber-reinforced resin.

Further, in the above-described structure for a passenger vehicle interior according to the present invention, it is possible to employ a structure wherein the above-described bowl-shaped structure part is formed as a supporting part for a load transmitted from a vehicle structure part which is disposed adjacently to and outside the bowl-shaped structure part in the front-rear direction of the structure. Because the structure for a passenger vehicle interior according to the present invention forms a main structure part of the vehicle interior, it is possible to dispose a part in front of the vehicle interior of the passenger vehicle, that is, a front part of the vehicle, at a position in front of the structure and a part in the rear of the vehicle interior of the passenger vehicle, that is, a rear part of the vehicle, at a position in the rear of the structure, respectively. Since there is a possibility that a load such as an impact is applied to the bowl-shaped structure part of the structure by a front collision or a rear collision in these front part and rear part, it is designed that the load at that time is received by the structure for the vehicle interior having a rigid structure. By this, safety of a passenger in the vehicle interior can be ensured more securely. Further, in such a structure, if the front part or the rear part of the vehicle is formed in a crushable structure, an ideal entire structure for ensuring safety of a passenger, that a load being transmitted into the vehicle interior is checked by the rigid structure of the structure for the vehicle interior while an impact due to collision and the like is adequately absorbed by the crushable structure, can be realized. Further, in these front part or rear part, there is a case where an attachment structure for a member for a drive system such as a wheel, a wheel shaft or a suspension is provided. In such a case, because there is a possibility that a load in respect of drive from these members for the drive system is transmitted from the front part or the rear part to the bowl-shaped structure part of the structure for the vehicle interior, it is designed that the load at that time is received by the structure for the vehicle interior having a rigid structure. By this, it becomes possible that the structure for the vehicle interior takes a function as a supporting structure for the members for the drive system, and a structure for a passenger vehicle interior capable of reducing a cost for production more greatly can be realized.

In the present invention, the reinforcing fibers of the fiber-reinforced resin used for a structure for a vehicle interior (including a subsidiary structure and a panel structure described later) are not particularly limited, and carbon fibers, glass fibers, aramide fibers and the like can be used, and further, a hybrid structure combining these reinforcing fibers can also be employed. Further, the matrix resin of the fiber-reinforced resin also is not particularly limited, and both of a thermosetting resin and a thermoplastic resin can be used. As a usable thermosetting resin, typically, an epoxy resin is exemplified. For molding in a case using a thermosetting resin, a molding method such as an RTM (Resin Transfer Molding) or a press molding using a prepreg can be employed. In case of a thermoplastic resin, in addition to the above-described molding methods, an injection molding can also be employed. As a usable thermoplastic resin, for example, a polyamide (nylon 6, nylon 66, etc.), a polyolefin (polyethylene, polypropylene, etc.), a polyester (polyethylene terephthalate, polybutylene terephthalate, etc.), polycarbonate, polyamideimide, polyphenylene sulfide, polyphenylene oxide, polysulfone, polyethersulfone, polyetheretherketone, polyetherimide, polystyrene, ABS, liquid crystal polyester, copolymer of acrylonitrile and styrene, etc. can be used. A mixture thereof may be used. Further, a copolymer such as copolymerized nylon of nylon 6 and nylon 66 may be used. Furthermore, in accordance with required properties of a molded product to be obtained, flame retardant, weather resistance improvement agent, and the other antioxidant, thermal stabilizer, ultraviolet absorbent, plasticizer, lubricant, colorant, compatibilizer, conductive filler, etc. can be added.

A method for manufacturing a structure for a passenger vehicle interior according to exemplary embodiments of the present invention is characterized in that the whole of the above-described structure for a passenger vehicle interior is integrally molded. By molding integrally, improvement of productivity and ensuring necessary strength and rigidity can be both achieved.

Further, in the above-described method for manufacturing a structure for a passenger vehicle interior according to the present invention, it is possible to mold the whole of the structure for a passenger vehicle interior at a time substantially simultaneously at an identical molding process. Namely, the whole of the structure to be molded is molded at a time simultaneously at an identical molding process (for example, in a same mold), and a structure having a target formation can be molded extremely efficiently in a short period of time.

Further, in case for manufacturing the aforementioned structure for a passenger vehicle interior having at least one of a keel or a rib, it is possible to employ a method wherein first, the structure is molded as divided structures divided at a section including at least one of a keel and a rib (namely, two or more divided structures), and after the molding, the divided structures are joined to each other. In this method, for example, a manner can be employed wherein the keel or the rib is divided in the thickness direction of the final form thereof, and the divided parts of the keel or rib are integrally joined to each other to complete the predetermined final-form keel or rib as well as to complete the whole of the final-form structure for a vehicle interior. In such a manner, a broad area for joining can be ensured when the divided parts of the keel or rib are joined to each other, a high joining strength can be ensured, and because the joining surfaces can be formed as flat surfaces, positioning and operation for the joining can be facilitated, and therefore, the manufacture of the whole of the structure can be facilitated.

Furthermore, in the method for manufacturing a structure for a passenger vehicle interior according to the present invention, it is possible to mold the structure using a cone mold and a core box. For example, it is possible to perform a predetermined integral molding, further, molding at a time, by employing a manner wherein an upper mold of a cone mold is inserted from an upper position relative to the aforementioned opening edge part of the structure opening part, for a part which the cone mold cannot reach, such as the inner surface side and the like of the bowl-shaped structure part, the core box is disposed, to form a predetermined shape to be molded, and under such a condition, between a lower mold and the cone mold and core box as an upper mold, for example, a thermoplastic resin containing reinforcing fibers is injected, and after the resin is cooled and solidified, the cone mold is removed upwardly, and the core box is removed from the vacant space after the removal of the cone mold. Instead of injection molding, RTM or press molding utilizing a prepreg and the like can be employed. As the above-described core box, an elastic material, a package material charged with particles, further, a balloon-like material (for example, a rubber balloon-like material) capable of being expanded and shrunk can be used. Further, it is possible to use a material extending annularly as the core box and dispose it around the cone mold. Furthermore, if a convex mold being convex toward the molded product side is used as the upper mold or the core box, it also becomes possible to facilitate lamination of a prepreg thereonto, etc.

In the above-described structure for a passenger vehicle interior according to the present invention, further, it is possible to reinforce the structure by a subsidiary structure. For example, a structure can be employed wherein the above-described structure for a passenger vehicle interior further has a subsidiary structure connected to the structure for the vehicle interior for supplementing and reinforcing the structure for the vehicle interior, the subsidiary structure has at least an annular wall which has a main opening part opened in a direction toward a front-rear direction of the vehicle and spreading all over a cross section of the vehicle interior and which continuously extends annularly around the main opening part, and has a connection wall which is adjoined to the annular wall and extends from the annular wall in the front-rear direction of the vehicle and which is connected with the structure for the vehicle interior, and the whole of these parts for forming the structure for the vehicle interior is integrally formed by a fiber-reinforced resin.

In such a configuration having a subsidiary structure, since the subsidiary structure reinforcing the structure for the vehicle interior has an annular wall continuously extending annularly around the main opening part, and this annular wall can be disposed, for example, in a hoop-like form so as to surround the vehicle interior over the entire circumference thereof at a central position of the vehicle interior in the front-rear direction of the vehicle, in particular, at the time of rollover and the like of the vehicle, it becomes possible to adequately suppress transmission of an external load into the vehicle interior by this annular wall, and safety of a passenger can be adequately ensured. Further, also at the time of side collision and the like, because the annular wall adequately suppresses transmission of an external load into the vehicle interior, similarly safety of a passenger can be adequately ensured. Since this annular wall is formed annularly around the main opening part spreading all over the cross section of the vehicle interior, basically it does not become an obstacle for forming a vehicle interior as a residence space, and it is provided easily. Further, since the subsidiary structure having this annular wall is joined to the structure for a vehicle interior, the fixing strength to the vehicle interior, ultimately, to the whole of the vehicle, can be easily ensured to be sufficiently high. Then, since the whole of the structural part of the subsidiary structure including the annular wall and the connection wall is integrally formed by a fiber-reinforced resin, in addition to ensuring light property in weight, the whole of the subsidiary structure can be easily set at sufficient strength and rigidity, and further, if integral molding is employed, in particular, if molding at a time for simultaneously molding the respective parts is employed, improvement of the productivity, particularly, an excellent mass productivity, and reduction in cost for manufacture can be both expected simultaneously. Further, as aforementioned, in an electric vehicle capable of using an electric motor as a power source, because the freedom for designing a vehicle body is increased greatly, this advantage can be reflected also to the design freedom for the subsidiary structure, and by this, it can be achieved to efficiently supplement and reinforce the structure for the vehicle interior at a desired state by the subsidiary structure having a simple shape, and it also becomes possible to facilitate removal from a mold and the like at the time of molding the subsidiary structure, and therefore, further improvement of the productivity and the like can be expected.

In the above-described structure, the above-described subsidiary structure can be formed as a rear-side subsidiary structure connected to the rear side of the structure for the vehicle interior, also can be formed as a front-side subsidiary structure connected to the front side of the structure for the vehicle interior, and also can be formed so as to include both the rear-side subsidiary structure connected to the rear side of the structure for the vehicle interior and the front-side subsidiary structure connected to the front side of the structure for the vehicle interior.

In case where the subsidiary structure is formed as a rear-side subsidiary structure connected to the rear side of the structure for the vehicle interior, the rear-side subsidiary structure is preferably formed as a structure having a curved wall curved and extending along the shape of the structure for the vehicle interior (for example, a curved wall extending at a semicircular form) from the above-described annular wall toward the rear side. In this case, a structure can be employed wherein an opening part is formed at each of both sides of the curved wall in a width direction of the vehicle, and by this, a simple structure light in weight having wall part as little as possible can be achieved although necessary wall parts exist. Further, when an integral molding is considered, by forming such a plurality of opening parts opening in different directions, it becomes possible to facilitate the removal from mold and the like, thereby further facilitating the manufacture.

Further, although the configuration of the structure for the vehicle interior having the above-described subsidiary structure is not particularly restricted, for example, in case where a keel, which is a reinforcing vertical wall extending in the front-rear direction of the vehicle, is provided in the structure for the vehicle interior, it is possible to employ a structure in which the above-described curved wall is integrally joined to the keel, and by this, it becomes possible to further strengthen the joining of the subsidiary structure and the structure for the vehicle interior to form a high-strength and high-rigidity integrated structure including the structure for the vehicle interior.

Further, in case where the subsidiary structure is formed as a front-side subsidiary structure connected to the front side of the structure for the vehicle interior, the front-side subsidiary structure preferably has a cross wall extending across the structure for the vehicle interior in its width direction. Such a cross wall can increase the rigidity of the whole of the subsidiary structure as well as can increase the joining strength with the structure for the vehicle interior, and further, for example, it also becomes possible to have a function for reinforcing a portion of the structure for the vehicle interior near an instrument panel.

Further, in case where both the rear-side subsidiary structure connected to the rear side of the structure for the vehicle interior and the front-side subsidiary structure connected to the front side of the structure for the vehicle interior are included as the subsidiary structure, a structure can be employed wherein annular walls of the rear-side subsidiary structure and the front-side subsidiary structure are integrally coupled by a coupling wall extending in the front-rear direction of the vehicle. In such a structure having the coupling wall, the function for reinforcing the vehicle interior due to the annular walls of the front and rear-side subsidiary structures can be further enhanced by adding the coupling wall, and for example, this coupling wall can also be formed as one forming a hinge attachment part for a wing-type door, and therefore, it also becomes possible to give a function for supplementing an additional structural part required for the structure for the vehicle interior together.

Further, in case of any type of subsidiary structure, in the subsidiary structure in the present invention, a structure can be employed wherein the above-described annular wall forms a hinge attachment part for a door (not a wing-type door, but a usual-type door). Also in such a structure, it becomes possible to give a function for supplementing an additional structural part required for the structure for the vehicle interior together to the annual wall. Furthermore, in an open car-type vehicle, in particular, in a case including the front-side subsidiary structure, it is also possible to make a part of the subsidiary structure, particularly, an upper part of the subsidiary structure, function as a window frame.

Moreover, in the present invention, in order to further increase the strength and the rigidity and ensure a high design freedom, it is possible to form at least a part of the above-described structure for a vehicle interior and subsidiary structure by using a specified panel structure. For example, a structure can be employed wherein at least a part of the structure for a passenger vehicle interior according to the present invention is formed using a panel structure comprising an aggregate adjoined with a plurality of FRP structural elements, and each of the FRP structural elements comprises a fiber-reinforced resin molded material formed in a polygon of a pentagon or a hexagon as a plane shape wherein a stiffener is formed on all sides of the polygon to form a closed loop ridge structure, and an inside of the closed loop ridge structure is formed in a plane structure.

Where, various shapes can be employed as the cross-sectional shape of the above-described stiffener, namely, as the cross-sectional shape of the above-described ridge, and for example, various sectional shapes can be exemplified such as a polygon such as a hat shape, a triangle, a rectangle, a trapezoid and a hexagon, and C-shaped, I-shaped, T-shaped, Z-shaped, H-shaped, reverse L-shaped and reverse U-shaped forms, and further, a rib shape formed as a simple stood-up wall. Further, as the cross-sectional structure of the stiffener, a solid or hollow structure, and further, a sandwich structure interposing a core material composed of a foamed material and the like, can be employed. Furthermore, as the plane structure inside the closed loop structure, although typically a structure of a fiber-reinforced resin plate (a skin plate) having a relatively small thickness is employed, a sandwich structure interposing a core material composed of a foamed material and the like between skin plates, or a structure forming a portion between skin plates as a space, etc. can also be employed.

In such a panel structure, with respect to the above-described FRP structural element, because a stiffener is formed as a closed-loop shape on all sides of the polygon forming the outline of the FRP structural element to form a closed loop ridge structure, sufficiently high strength and high rigidity as the whole of the structural element are realized by the stiffener of the closed loop ridge structure. Further, because the inside of the closed loop ridge structure is formed in a plane structure, while a formation of the panel element is ensured as the whole of the FRP structural element, it becomes possible to give a function for transmitting a load in the plane, a function for absorbing a load transmitted from the stiffener part, etc. to the plane structure part which is lower in strength and rigidity than the stiffener part. For example, a structure can be realized wherein a flexural load is supported mainly by the stiffener part, a tensile load is supported by both the stiffener part and the plane structure part, and a compression load is supported by the stiffener part or by the plane structure part at a condition where a buckling is suppressed by the stiffener part. Therefore, it becomes possible to give a single FRP structural element necessary formation and function as a panel element while giving it high strength and high rigidity properties peculiar to FRP due to the condition where the material is FRP, and further, a lightness in weight as the whole of the structural element can be ensured. Then, since the plane shape of the FRP structural element is formed in a polygon of a pentagon or a hexagon, it becomes possible to easily adjoin the structural elements of same kind of polygon to each other or in combination of polygons of a pentagon and a hexagon, and by this adjoining, a desired panel structure having necessary area and shape can be made. Furthermore, if a buckling behavior of the plane structure part is utilized, when a great impact load and the like is applied, the whole of the FRP structural element is not broken at a time but it becomes possible to realize a structure in which the breakage proceeds partially and in order.

The panel structure in an embodiment of the present invention is formed from an aggregate adjoined with a plurality of the above-described FRP structural elements. As described above, since the plane shape of the FRP structural element is formed in a polygon of a pentagon or a hexagon, it becomes possible to easily perform a desired adjoining of the structural elements by adjoining the FRP structural elements of a same kind of polygons to each other or by adjoining the FRP structural elements of polygons of a pentagon and a hexagon in combination thereof, and by the adjoining, a desired panel structure having necessary area and shape can be made. In the adjoining, it is possible to appropriately alter the sizes or shapes of the FRP structural elements adjacent to each other, and it is also possible to appropriately alter or change the adjoining pitch of the FRP structural elements. Thus, by appropriately altering the sizes, the shapes or the adjoining pitch, it becomes possible to partially change the properties of the panel structure, for example, the mechanical properties such as strength and rigidity, and it becomes possible to give respective optimum properties to respective parts of the panel structure. Further, it is also possible to partially give an isotropic property to a part having a certain area in the panel structure. Of course, it is also possible to give a substantially uniform property over the whole of the panel structure. Furthermore, it also becomes possible to form the panel structure in a formation being partially curved or bent easily, and it becomes possible to form the whole of the panel structure in a desired formation more easily.

In particular, if an FRP structural element bent along at least one of diagonal lines of the above-described polygon is used, it becomes possible to form a curved part of the panel structure further easily. Further, by employing a structure where stiffeners forming the closed loop ridge structures of the FRP structural elements adjacent to each other are molded integrally with each other, or joined integrally to each other, it becomes possible to give further desirable high strength and high rigidity as the whole of the panel structure.

Further, in the above-described panel structure, it is also possible to employ a structure where a relative height is given to a density in disposition of stiffeners forming the closed loop ridge structures of the FRP structural elements. In order to give a relative height is to the density in disposition of stiffeners, it can be achieved by combining FRP structural elements different in size or shape, or by altering a disposition pitch of FRP structural elements, and further, by altering the size or shape of the FRP structural elements themselves. As needed, by increasing the density in disposition of stiffeners partially, it becomes possible to adequately increase the strength or rigidity of at the part, and by decreasing the density in disposition of stiffeners partially and relatively, it becomes possible to suppress the amount of use of material as the whole of the panel structure to the minimum, and it can contribute to lightening in weight and reduction in cost of the whole.

Such a panel structure is applied to at least a part of the structure for a passenger vehicle interior according to an embodiment of the present invention. For example, it is applied to the bowl-shaped structure part of the structure for a vehicle interior which is formed in a monocoque structure, and the curved part of the bowl-shaped structure part can be formed as a panel structure formed using the above-described FRP structural element bent along at least one of diagonal lines of the above-described polygon.

Thus, in the structure for a vehicle interior of a passenger vehicle and the manufacturing method thereof according to the present invention, by an integrated structure of a fiber-reinforced resin, a vehicle interior having an excellent rigid structure for ensuring safety of a passenger can be easily and securely formed, and further, it becomes possible to obtain a structure for a vehicle interior of a passenger vehicle with a monocoque structure excellent in lightness in weight and mass productivity at a low cost.

Further, by adding a subsidiary structure to the structure for a vehicle interior of a passenger vehicle according to the present invention, a desirable reinforcement of the whole of a vehicle interior of a vehicle can be achieved efficiently by the subsidiary structure with an integrated structure of a fiber-reinforced resin excellent in lightness in weight and moldability, and in particular, a vehicle interior having an excellent rigid structure for ensuring safety of a passenger against rollover or side collision can be easily and securely formed. Further, to the subsidiary structure, a function required for a structure for a vehicle interior in accordance with necessity can be easily added and supplemented. Furthermore, since the subsidiary structure in the present invention is excellent in assembling ability and also excellent in mass productivity, it is possible to manufacture it at a low cost.

Moreover, if the formation of the panel structure adjoined with the aforementioned FRP structural elements is applied to at least a part of the structure for a vehicle interior of a passenger vehicle according to the present invention, by forming the respective structural elements of a fiber-reinforced resin as specified forms having excellent strength and rigidity and capable of being adjoined with each other, it can be served to form a structure having a desirable entire shape at a high design freedom. Then, the desirable panel structure can be easily manufacture at a low cost by adjoining such FRP structural elements to each other, while excellent lightness in weight and mechanical properties of FRP are exhibited, load transmission property, strength and rigidity desired as the whole of the panel structure can be given, and in particular, as the structure for a vehicle interior, a structure having desirable formation and properties can be obtained at an excellent mass productivity and at a low cost.

DETAILED DESCRIPTION OF EMBODIMENTS OF THE INVENTION

Hereinafter, desirable embodiments of the present invention will be explained referring to figures.

Figure 1:
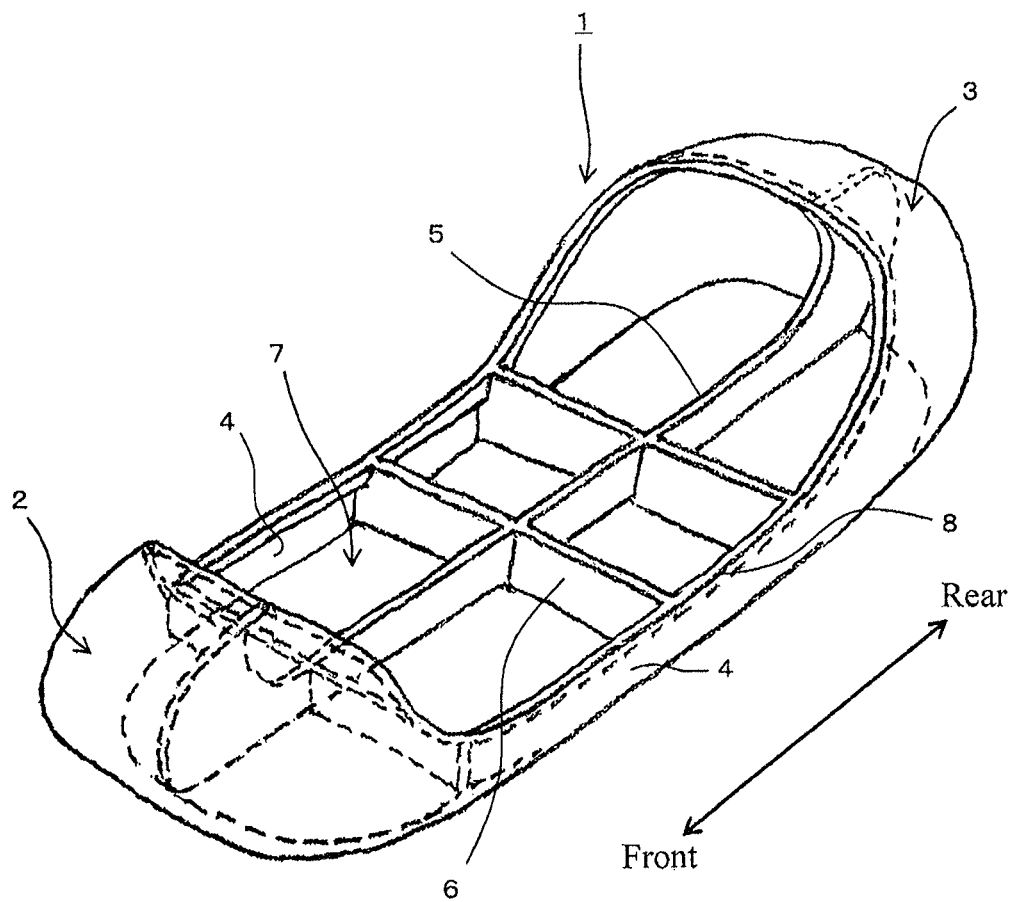
FIG. 1 is a perspective view of a structure for a vehicle interior of a passenger vehicle according to an embodiment of the present invention.

FIG. 1 shows a structure for a vehicle interior of a passenger vehicle according to an embodiment of the present invention. A structure for a vehicle interior of a passenger vehicle 1 is a structure in which a vehicle interior structural part for forming a vehicle interior of a passenger vehicle and a part positioned thereunder including a vehicle base part are formed integrally, and it is formed in a monocoque structure (in this embodiment, molded integrally) in which the whole of the structure from a front side to a rear side of the vehicle interior is integrally formed by a fiber-reinforced resin (for example, carbon fiber-reinforced resin). At a front side of this structure 1, a front-side bowl-shaped structure part 2 which opens toward a rear side is provided, and at the rear side of the structure 1, a rear-side bowl-shaped structure part 3 which opens toward the front side is provided. At both side parts (both side parts in the width direction of the vehicle), side-wall parts 4, formed as vertical walls that are continuous integrally with the bowl-shaped structure parts 2, 3 and extend in a front-rear direction of the structure 1, are provided, and the respective parts are molded integrally. In this embodiment, each of bowl-shaped structure parts 2, 3 is formed as an approximately rectangular bowl-shaped structure having a round at each corner thereof. By such a structure for a vehicle interior of a passenger vehicle 1 having bowl-shaped structure parts 2, 3 and side-wall parts 4, a rigid structure for the vehicle interior can be achieved effectively, and at the same time, by being made by a fiber-reinforced resin, a lightness in weight can be ensured, and further, by integral molding of the whole, a good productivity, particularly, mass productivity, and reduction of cost can be achieved.

Figure 2:
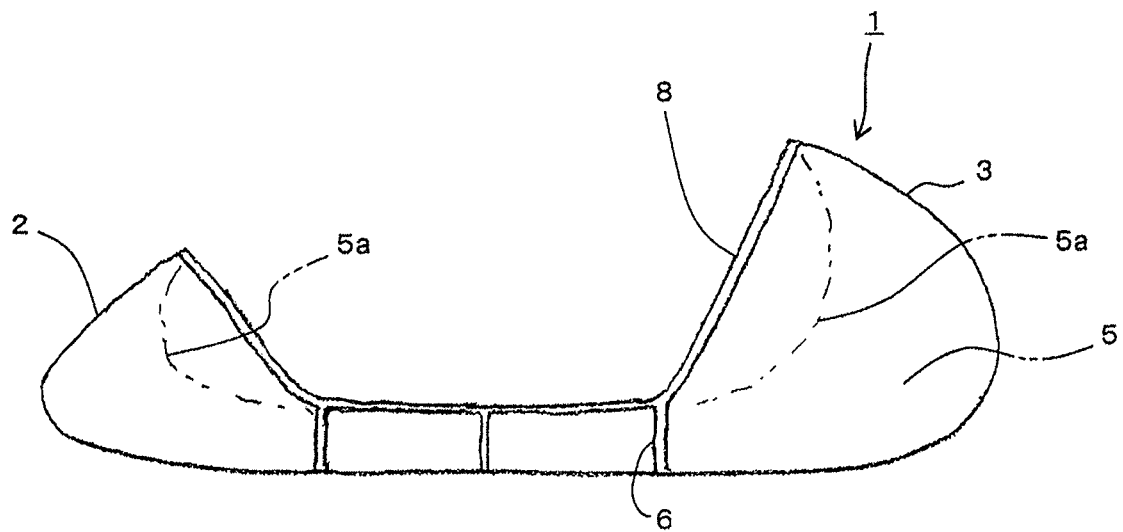
FIG. 2 is a vertical sectional view of the structure shown in FIG. 1 as viewed from a direction of the side of the structure.
Figure 3:
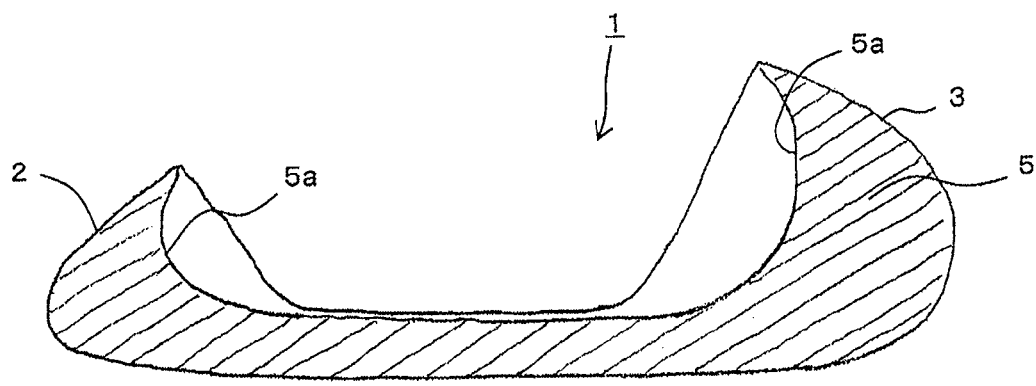
FIG. 3 is a vertical sectional view showing a vertical shape of a keel in the structure shown in FIG. 1.
Figure 5:
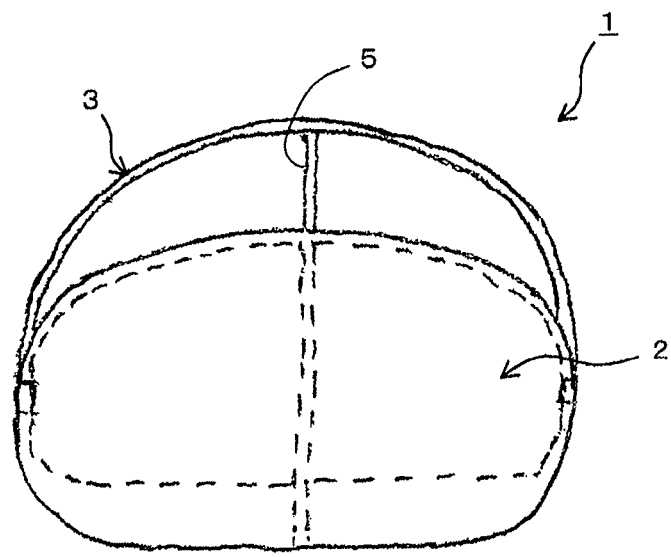
FIG. 5 is an elevational view of the structure shown in FIG. 1 as viewed from the front part side.

On the inner surface side of the above-described structure 1, a keel 5, extending in the front-rear direction of the structure 1 over the entire length of the structure 1 including both bowl-shaped structure parts 2, 3 and formed as a vertical wall, is provided. Keel 5 is formed, in bowl-shaped structure parts 2, 3, as a vertical wall extending from a bottom surface to a ceiling surface of each of bowl-shaped structure parts 2, 3, and in this embodiment, in bowl-shaped structure parts 2, 3, as shown in FIGS. 2 and 3, it has an inner edge 5a extending at a curved condition in the vertical direction at a position inside the opening edge of bowl-shaped structure part 2 or 3. In this embodiment, although this keel 5 is provided by one at the central part in the width direction of structure 1, a plurality of keels may be provided, and the positions for disposition thereof in the width direction of structure 1 are not particularly restricted. Further, as long as it is provided in at least one of the bowl-shaped structure parts, keel 5 can be formed also as a structure partially extending in the front-rear direction of structure 1. As is explicit also from FIG. 5, because particularly keel 5 can exhibit an operation such as a prop against front collision or side collision, by the disposition of this keel 5, the strength and rigidity of the whole of structure 1, in particular, the strength and rigidity in the front-rear direction and the torsional rigidity, can be increased greatly.

Further, ribs 6 are provided in structure 1 so as to extend substantially over the entire width of structure 1 in the width direction, and in this embodiment, totally three ribs 6 are provided at a central part of structure 1 in the front-rear direction and the opening parts of both bowl-shaped structure parts 2, 3, separately from each other with an interval in the front-rear direction. However, the number of ribs 6 is not particularly limited. Although the length of rib 6 is not particularly restricted, a condition, where it is connected to keel 5 and both side-wall parts, is most preferable on reinforcement effect. By the reinforcement due to ribs 6, the strength and rigidity of the whole of structure, in particular, the strength and rigidity and the torsional rigidity in the width direction, can be further increased greatly.

Figure 4:
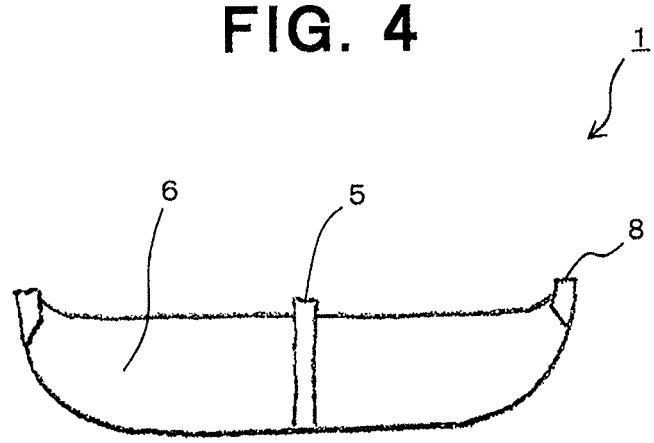
FIG. 4 is a cross-sectional view of the structure shown in FIG. 1 at a central part thereof in the front-rear direction.

Further, in structure 1, at least on an upper edge part of side-wall parts 4 among an opening edge part of a structure opening part 7 opened upwardly which is formed by opening edge parts of bowl-shaped structure parts 2, 3 and the upper edge part of the side-wall parts 4 that is continuous with the opening edge parts of the bowl-shaped structure parts 2, 3, in this embodiment, over the entire length of the opening edge part of the structure opening part 7, a gunnel 8 extending along the opening edge part is provided. This gunnel 8, for example, as shown in FIG. 4, is formed in a shape having an edge reinforcement structure for the opening edge part of structure opening part 7, and therefore, it also functions for reinforcing the upper edge part of both side-wall parts 4, ultimately, the whole of both side-wall parts 4 themselves. Where, the opening edge part of structure opening part 7 is formed in a shape capable of going in and out with a cone mold used for molding of structure 1 described later.

Since the above-described structure for a vehicle interior of a passenger vehicle 1 forms a main structural part for the vehicle interior of the passenger vehicle, a certain vehicle structure part (not shown in the figures) for forming the vehicle is disposed adjacently to and outside in the front-rear direction of the structure 1. Each of the above-described bowl-shaped structure parts 2, 3 is formed so as to be able to function also as a supporting part for a load transmitted from the adjacently disposed vehicle structure part. For example, in case where the adjacently disposed vehicle structure part is formed in a crushable structure against an impact load as aforementioned, an impact can be adequately absorbed at the vehicle structure part with the crushable structure and a load to be transmitted therefrom toward the vehicle interior can be checked by the bowl-shaped structure parts 2, 3 capable of functioning also as a supporting part for the load, further by the rigid structure of the structure 1 formed integrally with the bowl-shaped structure parts 2, 3, and therefore, safety of a passenger in the vehicle interior can be ensured efficiently by utilizing both of the crushable structure and the vehicle interior rigid structure.

Figure 6:
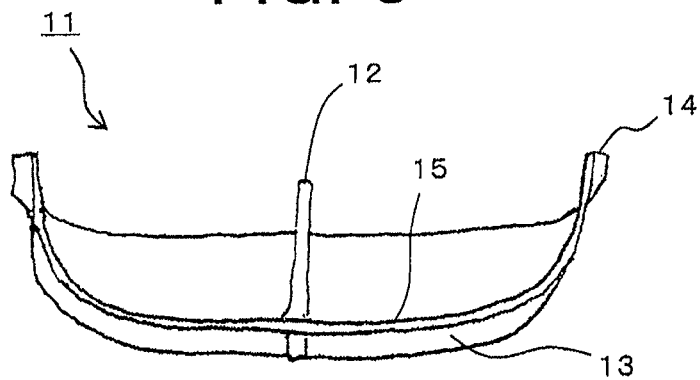
FIG. 6 is a cross-sectional view of a structure at a central part thereof in the front-rear direction according to a modification of the structure shown in FIG. 1.

FIG. 6 shows a modification of the structure shown in FIGS. 1 and 4. In this embodiment, at least any one of a keel 12, a rib 13 and a gunnel 14 of a structure for a vehicle interior of a passenger vehicle 11 (in the embodiment shown in the figure, all of these) is formed to project outside a shell 15 (for example, a floor forming part) of the structure 11. Alternatively, at least any one of keel 12, rib 13 and gunnel 14 is formed to project only outside shell 15 of the structure 11. In such a structure, it becomes possible to use the inner surface side of structure 11 for forming the vehicle interior side relatively broadly as a relatively smooth surface, and in case where it is necessary to attach parts (for example, parts such as battery modules) to the outer surface side of the structure 11 or in case where it is required to join the structure to another structure at the outer surface side of the structure 11, it becomes possible to utilize it more conveniently as a base for the attachment or the joining.

Figure 7:
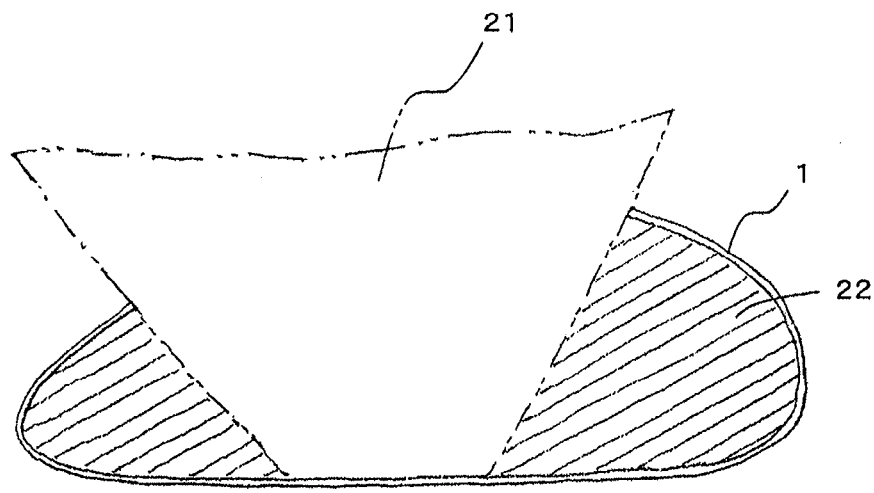
FIG. 7 is a vertical sectional view of the structure shown in FIG. 1 as viewed from a direction of the side of the structure, showing an example of manufacturing method thereof.
Figure 8:
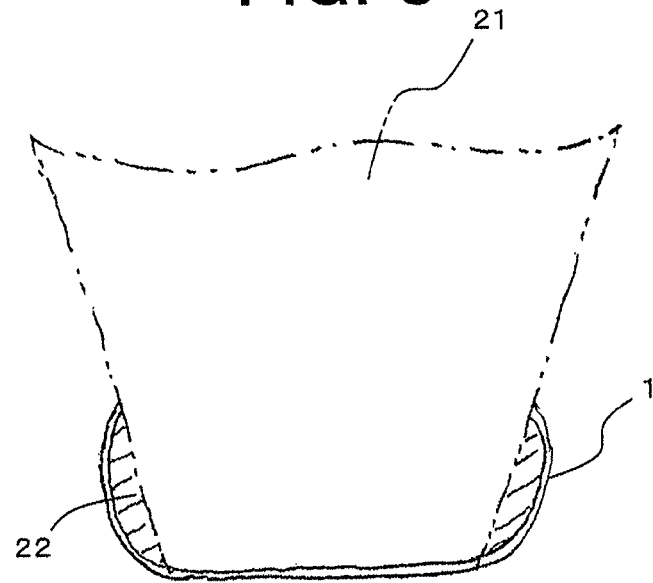
FIG. 8 is a cross-sectional view of the structure at a central part thereof in the front-rear direction in the manufacturing method shown in FIG. 7.

It is possible to integrally mold the above-described structure for a vehicle interior of a passenger vehicle according to the present invention having an integrated structure, for example, by a molding method as shown in FIGS. 7 and 8. In FIGS. 7 and 8, an embodiment is exemplified wherein an upper mold 21 of a cone mold, and an annular core box 22 extending in a circumferential direction of the upper mold 21 in the upper mold 21 and capable of being expanded and contracted, are used, and structure 1 is molded at a time. By using such an upper mold 21 of a cone mold, easy going in and out of the upper mold 21 can be performed without being caught by the opening part of structure 1. Further, by using annular core box 22 capable of being expanded and contracted, it becomes possible to substantially form a mold also for an inner surface of structure 1 which cannot be dealt by upper mold 21. This core box 22 can be taken out by being contracted as needed. By such a molding method, a desired structure for a vehicle interior of a passenger vehicle 1 can be easily molded, and a mass production also becomes possible.

Figure 9:
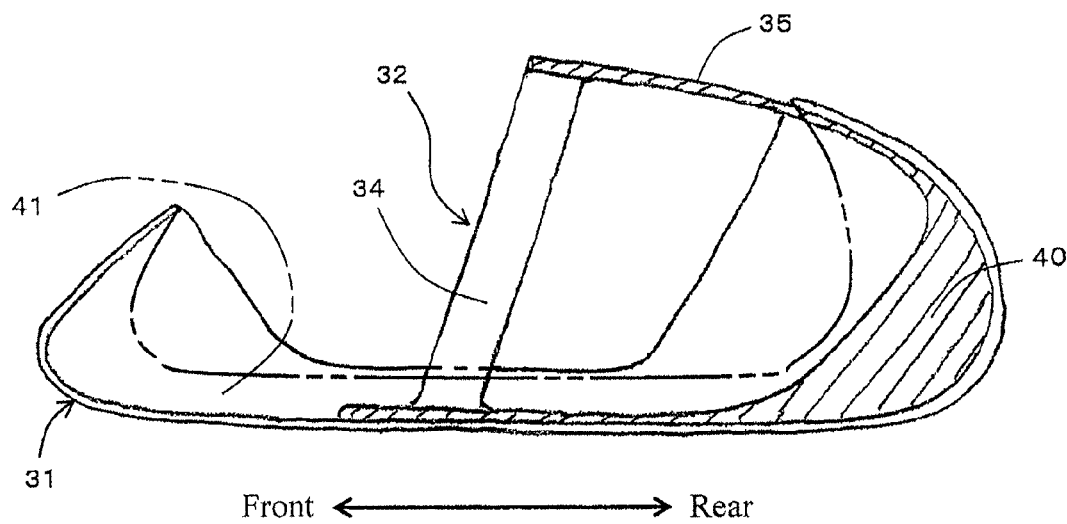
FIG. 9 is a schematic vertical sectional view of a structure for a vehicle interior of a passenger vehicle incorporating a subsidiary structure thereinto according to another embodiment of the present invention.
Figure 10:
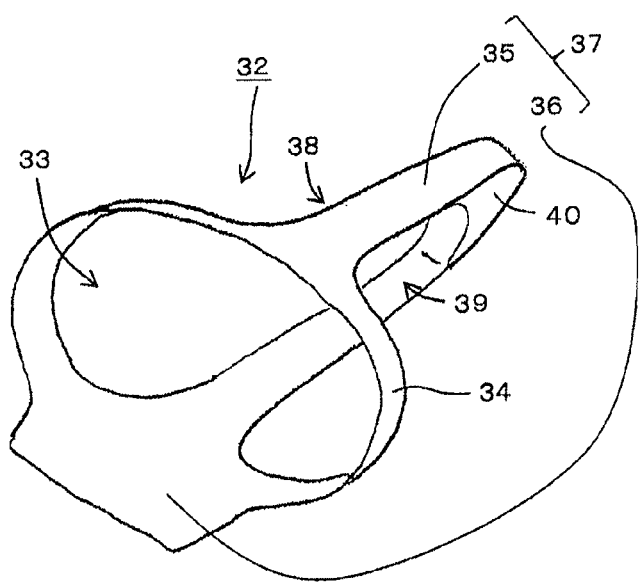
FIG. 10 is a perspective view of the subsidiary structure shown in FIG. 9.

FIG. 9 shows a schematic vertical sectional view of a structure for a vehicle interior of a passenger vehicle incorporating a subsidiary structure thereinto according to another embodiment of the present invention. In FIG. 9, symbol 31 indicates a structure for a vehicle interior for forming an vehicle interior of a passenger vehicle, in particular, a structure for a vehicle interior for forming a part excluding a roof part, and in the rear side of this structure for a vehicle interior 31 in the front-rear direction of the vehicle (the arrow direction), in this embodiment, from the inside thereof, a subsidiary structure 32 according to an embodiment of the present invention is incorporated, and it is joined to the structure for a vehicle interior 31 to supplement and reinforce the structure of the vehicle interior. As shown also in FIG. 10, subsidiary structure 32 has an annular wall 34 which has a main opening part 33 opened toward the front side of the vehicle and spreading all over the cross section of the vehicle interior and which continuously extends annularly around the main opening part 33 and extends in a vertical direction. Further, annular wall 34 has a curved wall 35 which is adjoined to annular wall 34 and which is curved at a semi-circular form and extends along the shape of the structure for a vehicle interior 1 from the annular wall 34 toward the rear side of the vehicle, and this curved wall 35 and a lower wall 36 adjoined to the lower part of the annular wall 34, further, the lower part of the annular wall 34, form a connection wall 37 with structure for a vehicle interior 31. The whole of the structural parts of subsidiary structure 32 shown in FIG. 10 is formed integrally by a fiber-reinforced resin (for example, a carbon fiber-reinforced resin), and in this embodiment, molded integrally, in particular, molded at a time for molding the respective parts substantially simultaneously.

Opening parts 38, 39 are formed on both sides of the above-described curved wall 35 in the width direction of the vehicle, and on the rear end part of the curved wall 35, an enlarged portion 40 enlarged in area is formed. As shown in FIG. 9, in case where a keel 41, which is a reinforcement vertical wall extending in the front-rear direction of the vehicle, is provided in structure for a vehicle interior 1, it is preferred that curved wall 35 is joined integrally with keel 41, and in particular, it is preferred that it is joined securely with keel 41 at enlarged portion 40.

In such a structure according to this embodiment, by annular wall 34 extending annularly and continuously around main opening part 33, it becomes possible to form a desirable rigid structure for a vehicle interior, it becomes possible to adequately suppress transmission of an external load into a vehicle interior, for example, an impact load from outside at the time of rollover, side collision, etc., and safety of a passenger can be adequately ensured. Because this annular wall 34 is integrally joined to structure for a vehicle interior 31 together with connection wall 37, the fixing strength thereof for a vehicle interior, ultimately, for the whole of the vehicle, can be easily ensured to be sufficiently high. Then, since the whole of subsidiary structure 32 including these annular wall 34 and connection wall 37 is molded integrally with a fiber-reinforced resin, lightness in weight can be ensured as well as sufficient strength and rigidity as the whole of the subsidiary structure 32 can be easily set, and further, by molding integrally, in particular, by molding at a time for molding the respective parts simultaneously, an excellent mass productivity and reduction in cost for manufacture can be achieved at the same time. Further, in addition to main opening part 33, by forming opening parts 38, 39 also on both sides of curved wall 35, it becomes possible to easily perform setting and removal of the mold, and the integral molding can be facilitated. Moreover, in case where keel 41 is provided to structure for a vehicle interior 31, by joining curved wall 35 integrally with the keel 41, not only the curved wall 35 or annular wall 34 but also the whole of the structure joined can be increased in strength and rigidity. Furthermore, it is also possible to give a function of a hinge attachment part for a door to annular wall 34, and by a simple structure, another function required for a structural part for a vehicle interior can also be added easily.

Figure 11:
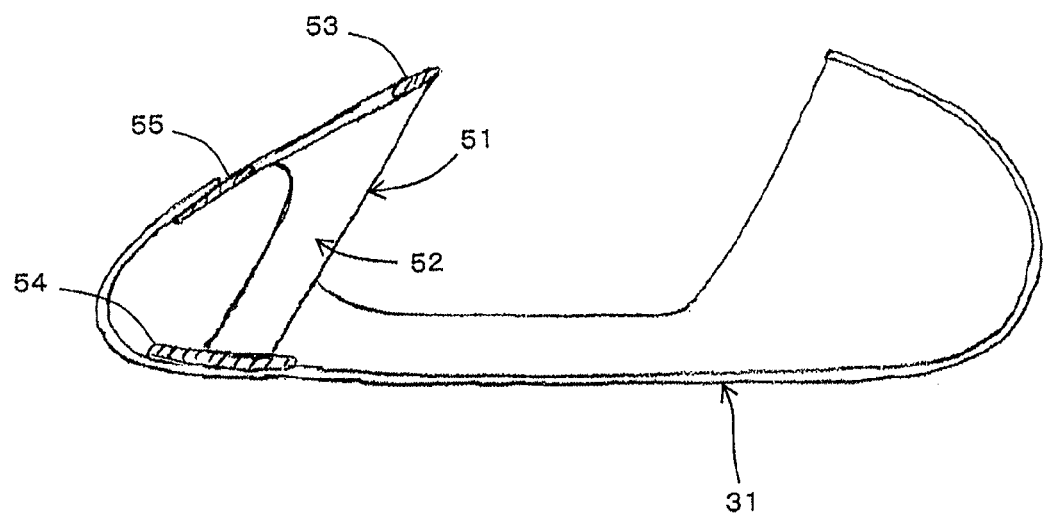
FIG. 11 is a schematic vertical sectional view of a structure for a vehicle interior of a passenger vehicle incorporating a subsidiary structure thereinto according to a further embodiment of the present invention.
Figure 12:
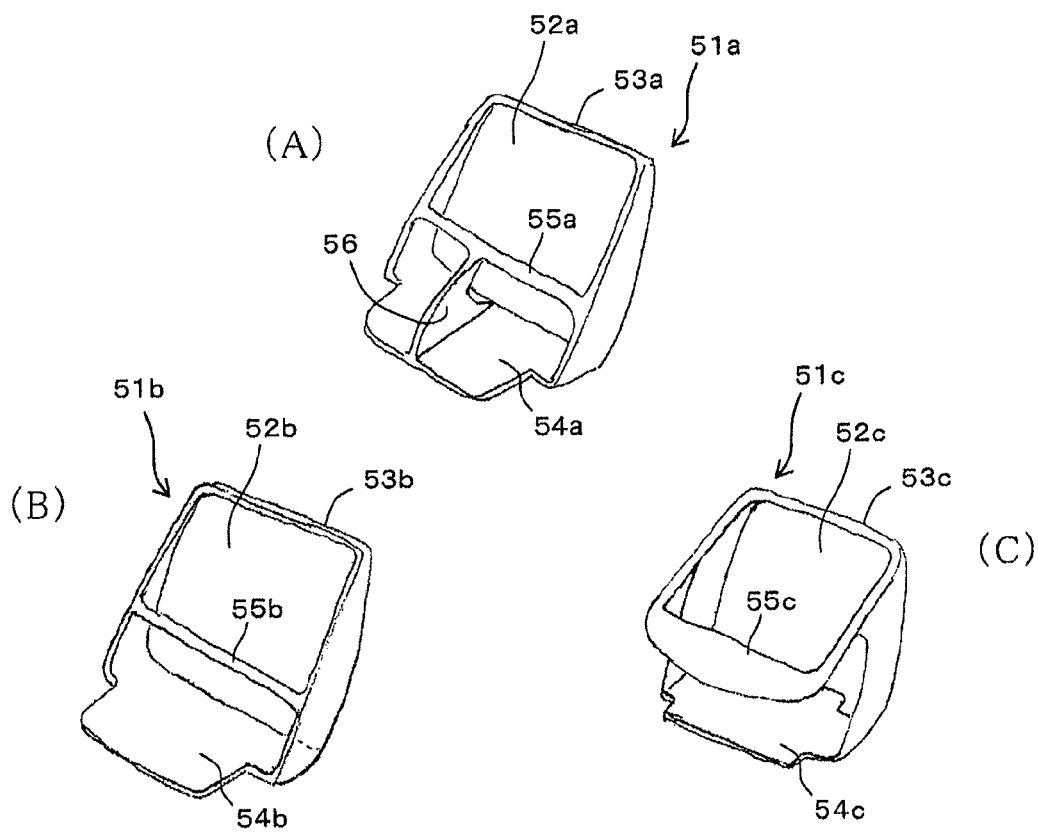
FIG. 12 shows perspective views showing examples of the subsidiary structure shown in FIG. 11.

FIG. 11 shows a case where another subsidiary structure 51 according to another embodiment of the present invention is incorporated into the front side of the structure for a vehicle interior 31 in the front-rear direction of the vehicle. This front-side subsidiary structure 51 can be formed as respective forms of subsidiary structures 51a, 51b and 51c, as shown in FIG. 12. Also in these front-side subsidiary structures 51, 51a, 51b and 51c, annular walls 53, 53a, 53b and 53c continuously extending annularly around main opening parts 52, 52a, 52b and 52c and extending in a vertical direction are formed, and connection walls 54, 54a, 54b and 54c adjoined to the annular walls with the structure for a vehicle interior 31 are provided. Further, these front-side subsidiary structures 51, 51a, 51b and 51c have cross walls 55, 55a, 55b and 55c extending across the structure for a vehicle interior 31 in the width direction. Further, as needed, as shown in FIG. 12(A), a rib wall 56 can also be provided. The whole of the structural parts of these subsidiary structures 51, 51a, 51b and 51c is formed integrally by a fiber-reinforced resin (for example, carbon fiber-reinforced resin), and in this embodiment, they are molded integrally, in particular, molded at a time for molding the respective parts substantially simultaneously.

In such structures according to this embodiment, similarly to in the aforementioned embodiment, by annular walls 53, 53a, 53b and 53c, it becomes possible to form desirable rigid structures for vehicle interiors and to adequately suppress transmission of an external load into a vehicle interior, for example, an impact load from outside at the time of rollover, side collision, etc., and safety of a passenger can be adequately ensured. Further, by integral joining of subsidiary structures 51, 51a, 51b and 51c to the structure for a vehicle interior 31, the fixing strength thereof for a vehicle interior, ultimately, for the whole of the vehicle, can be easily ensured to be sufficiently high. Then, by the conditions where the whole of subsidiary structures 51, 51a, 51b or 51c is molded integrally with a fiber-reinforced resin, lightness in weight can be ensured as well as sufficient strength and rigidity as the whole of the subsidiary structures 51, 51a, 51b or 51c can be easily set, and further, by molding integrally, in particular, by molding at a time for molding the respective parts simultaneously, an excellent mass productivity and reduction in cost for manufacture can be achieved at the same time. Further, in this embodiment, it is also possible to give a function for a window frame (in particular, a function for a window frame in a vehicle of an open car type) to annular walls 53, 53a, 53b or 53c of front-side subsidiary structures 51, 51a, 51b or 51c, and further, it is also possible to give a function for reinforcing an instrument panel or the vicinity in the vehicle interior to cross walls 55, 55a, 55b or 55c, and a structure for a required function can be easily supplemented.

Figure 13:
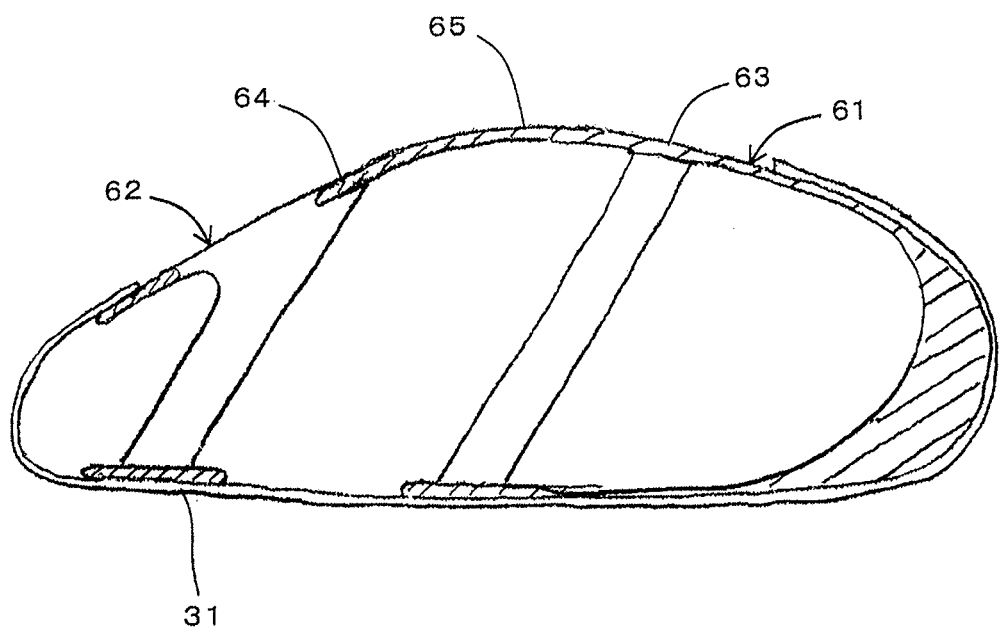
FIG. 13 is a schematic vertical sectional view of a structure for a vehicle interior of a passenger vehicle incorporating a subsidiary structure thereinto according to a still further embodiment of the present invention.
Figure 14:
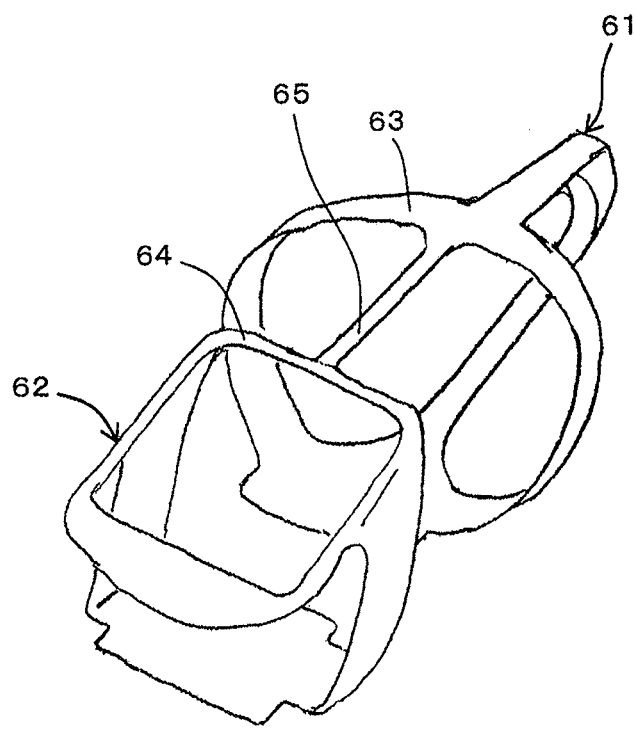
FIG. 14 is a perspective view of the subsidiary structure shown in FIG. 13.

FIG. 13 shows a further embodiment of the present invention, and shows a case including both of a rear-side subsidiary structure 61 joined to the rear side and a front-side subsidiary structure 62 joined to the front side of the structure for a vehicle interior 31, and in this embodiment, annular walls 63, 64 of the rear-side subsidiary structure 61 and the front-side subsidiary structure 62 are connected integrally by a connection wall 65 extending in the front-rear direction of the vehicle also as shown in FIG. 14. By providing such a connection wall 65, it becomes possible to further reinforce, in particular, annular walls 63, 64, thereby further improving the vehicle interior reinforcing function. Further, if this connection wall 65 is utilized for a hinge attachment part for a wing-type door, it also becomes possible to easily supplement additional structural parts for satisfying other required functions. It is possible to mold this connection wall 65 integrally with rear-side subsidiary structure 61 and front-side subsidiary structure 62, it is also possible to mold it integrally with one of rear-side subsidiary structure 61 and front-side subsidiary structure 62 and, after molding, to join it with the other subsidiary structure, and it is also possible to mold it separately from rear-side subsidiary structure 61 and front-side subsidiary structure 62 and to join it with both the subsidiary structures after both the subsidiary structures are assembled and the like.

Figure 15:
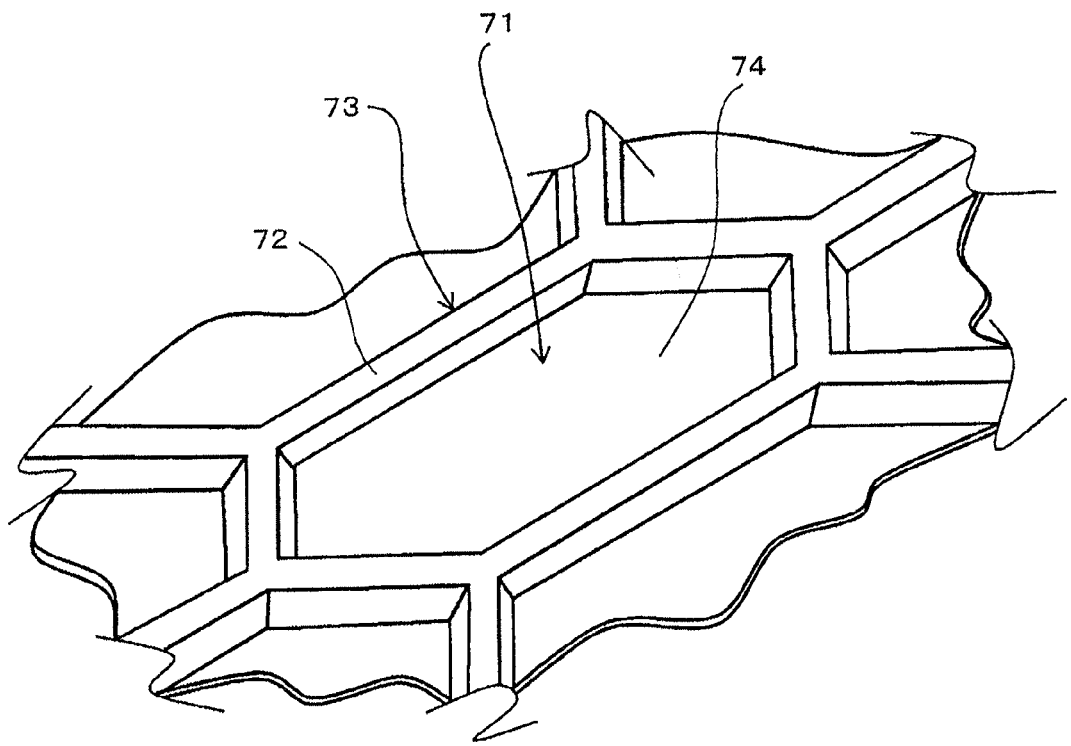
FIG. 15 is a perspective view showing an example of an FRP structural element part in a panel structure of a structure for a vehicle interior of a passenger vehicle according to a still further embodiment of the present invention.

FIG. 15 shows an example of an FRP structural element part in a panel structure of a structure for a vehicle interior of a passenger vehicle according to a still further embodiment of the present invention. In this embodiment, an FRP structural element 71 is formed in a polygon of a hexagon as a plane shape, and the whole of the structural element is formed as a molded product of a fiber-reinforced resin, in particular, as a molded product of a carbon fiber-reinforced resin. A stiffener 72 is formed on all sides of this hexagon to form a closed loop shape (a closed loop shape extending with a polygonal line) and to form a closed loop ridge structure 73, and the inside of the closed loop shape (the inside of the closed loop ridge structure 73) is formed in a plane structure 74 spreading in a plane-like condition. Stiffener 72 forming closed loop ridge structure 73 can be formed so as to be molded integrally with a stiffener forming a closed loop ridge structure of another adjacent FRP structural element (an FRP structural element formed in a hexagon or a pentagon), or so as to be joined integrally therewith.

Further, FRP structural element 71 is formed so as to be able to be bent along at least one of diagonal lines of the polygon, namely, in case of a hexagon, totally nine diagonal lines exist, and along at least one of the diagonal lines. Example of bending will be described later.

Figure 16:
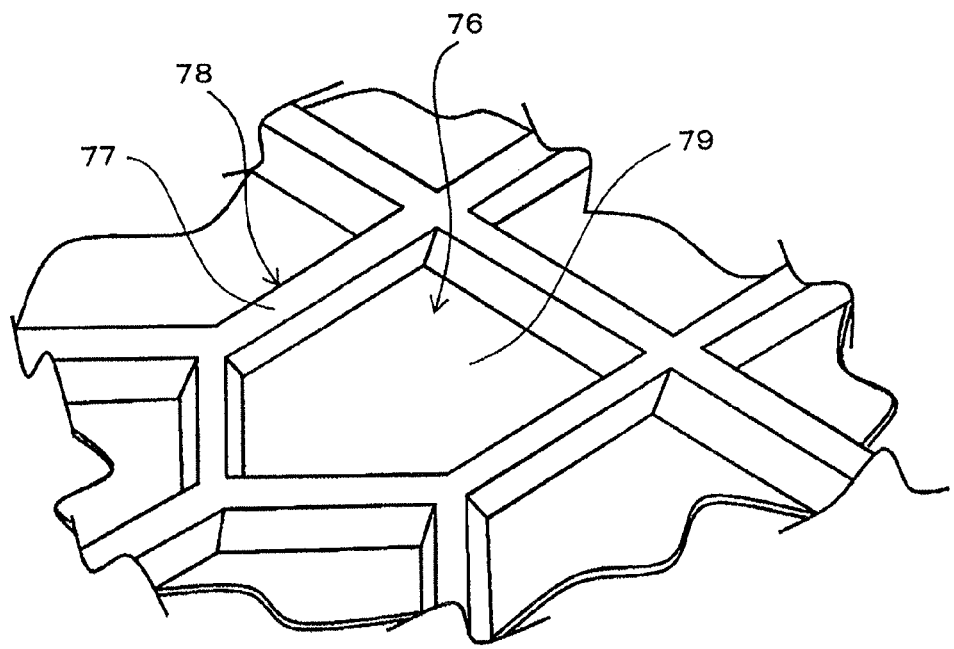
FIG. 16 is a perspective view showing another example of an FRP structural element part.

FIG. 16 shows an FRP structural element part according to another embodiment, and in this embodiment, the plane shape of an FRP structural element 76 is formed in a polygon of a pentagon, and the whole of the structural element is formed as a molded product of a fiber-reinforced resin, in particular, as a molded product of a carbon fiber-reinforced resin. A stiffener 77 is formed on all sides of this pentagon to form a closed loop shape (a closed loop shape extending with a polygonal line) and to form a closed loop ridge structure 78, and the inside of the closed loop shape (the inside of the closed loop ridge structure 78) is formed in a plane structure 79 spreading in a plane-like condition. Stiffener 77 forming closed loop ridge structure 78 can also be formed so as to be molded integrally with a stiffener forming a closed loop ridge structure of another adjacent FRP structural element (an FRP structural element formed in a pentagon or a hexagon), or so as to be joined integrally therewith. In this case of FRP structural element 76 of pentagon, totally five diagonal lines exist, and it is formed so as to be able to be bent along at least one of the diagonal lines.

Figure 17:
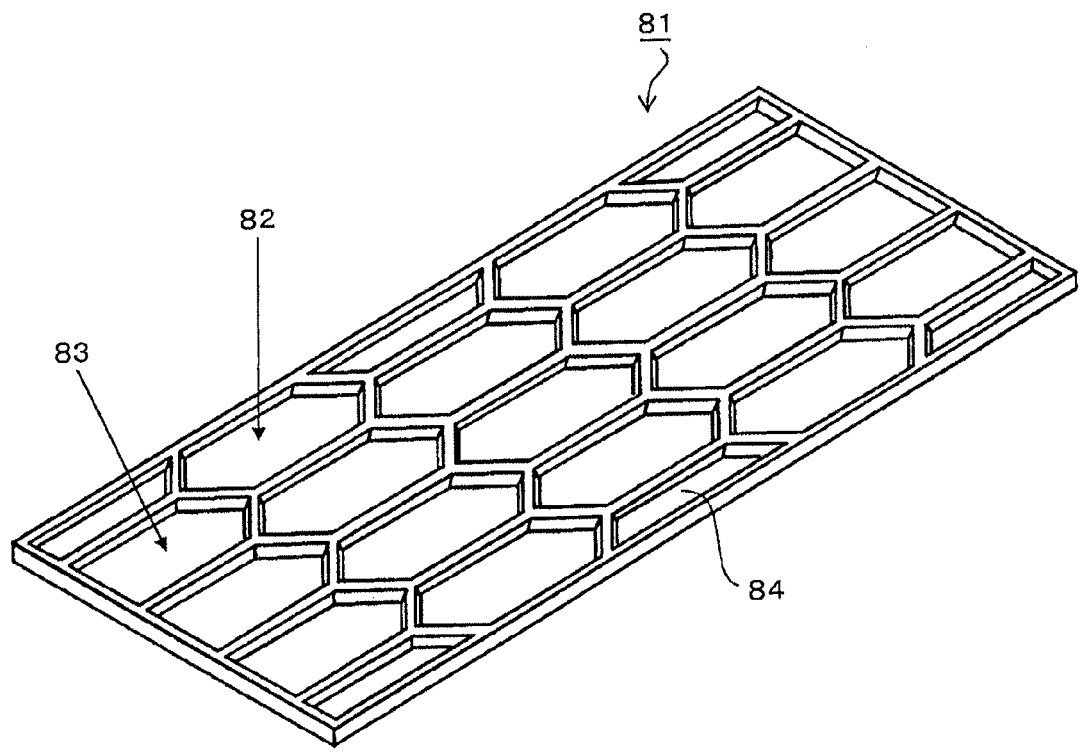
FIG. 17 is a perspective view showing an example of a panel structure part.
Figure 18:
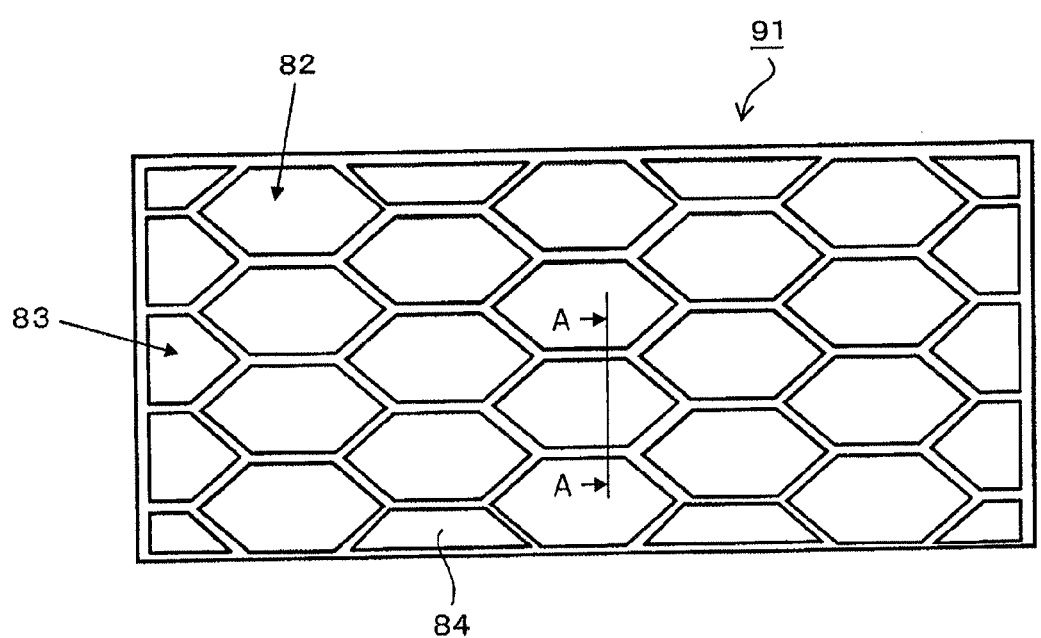
FIG. 18 is a plan view of a panel structure part equivalent to that shown in FIG. 17.
Figure 23:
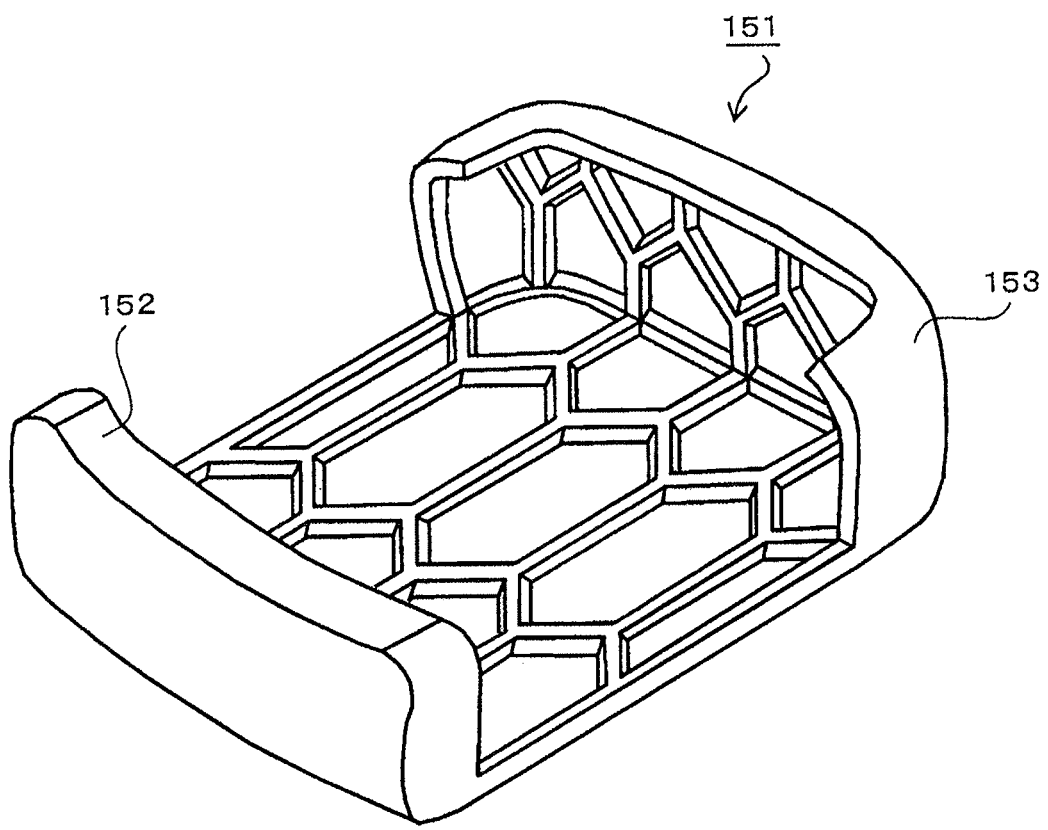
FIG. 23 is a perspective view of a structure for a vehicle interior of a passenger vehicle according to a further embodiment of the present invention, which is formed as a panel structure having FRP structural elements.

By making an aggregate adjoined with a plurality of the above-described FRP structural elements 71, 76, for example, flat plate-like panel structures 81, 91 (panel structure parts) as shown in FIGS. 17 and 18, or a panel structure as a structure for a vehicle interior for forming a vehicle interior of a vehicle as shown in FIG. 23 described later, can be formed. The adjoining of FRP structural elements 71, 76 can be carried out by integrally molding stiffeners forming closed loop ridge structures of FRP structural elements adjacent to each other, or by integrally joining (adhesion or fusion) stiffeners to each other.

Concretely, for example, as shown in FIGS. 17 and 18, flat plate-like panel structures 81, 91 are formed by appropriately combining FRP structural elements 82 shaped in hexagons and FRP structural elements 83 shaped in pentagons, and as needed, FRP structural elements 84 shaped in quadrangles are also combined. Such flat plate-like panel structures 81, 91 can be applied to broad fields. Since each FRP structural element has a closed loop ridge structure of stiffener and is adjoined at the stiffener part, high strength and rigidity can be exhibited, of course, as the single FRP structural element part, and as the whole of the panel structure. Further, since the inside of the closed loop ridge structure of stiffener is formed in a light plane structure part and the plane structure parts extends in a plane direction of the panel structure via respective stiffener parts, while the lightening in weight of the whole of the panel structure can be achieved, a desired form of the whole of the panel structure can be ensured.

Figure 19:
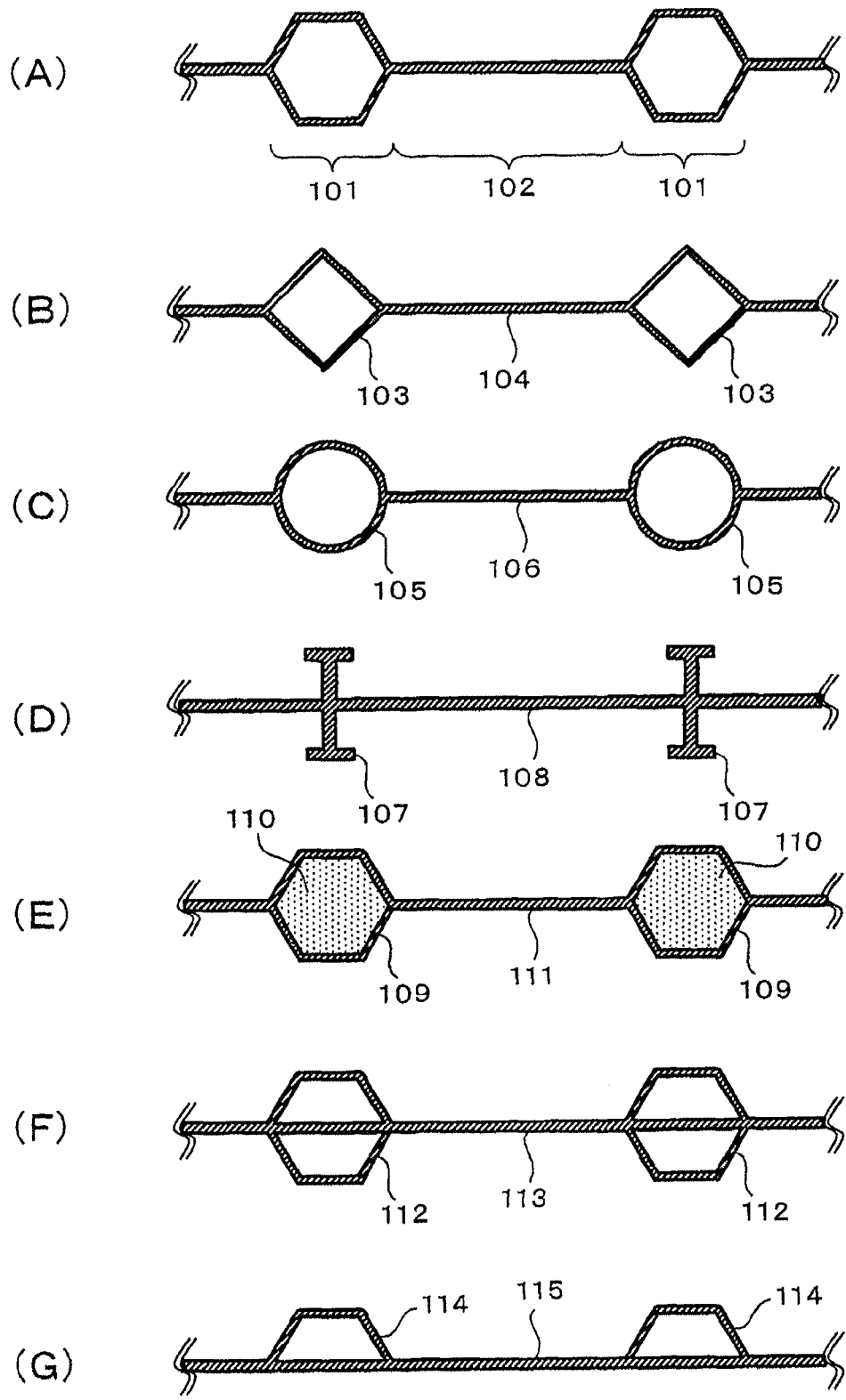
FIG. 19 shows partial sectional views as viewed along the line A-A of FIG. 18 showing various kinds of sectional shapes of stiffeners.

The cross-sectional shape of the stiffener in the FRP structural element and the panel structure is not particularly restricted, various shapes as aforementioned can be employed. For example, as a sectional form as viewed along line A-A in FIG. 18, various forms as exemplified in FIG. 19 can be employed. In a form shown in FIG. 19(A), a hollow stiffener part 101 shaped in a hexagon as its cross-sectional shape is formed, and a plane structure part 102 is formed between stiffener parts 101. In a form shown in FIG. 19(B), a stiffener part 103 shaped in a square as its cross-sectional shape is formed, and a plane structure part 104 is formed between stiffener parts 103. In a form shown in FIG. 19(C), a stiffener part 105 shaped in a circle as its cross-sectional shape is formed, and a plane structure part 106 is formed between stiffener parts 105. In a form shown in FIG. 19(D), a stiffener part 107 shaped in an I-form as its cross-sectional shape is formed, and a plane structure part 108 is formed between stiffener parts 107. In a form shown in FIG. 19(E), although a stiffener part 109 shaped in a hexagon as its cross-sectional shape is formed, a core material 110 (for example, a core material composed of a foamed resin and the like) is filled in the stiffener part 109 of hexagon composed of a fiber-reinforced resin to form the stiffener part, and between these stiffener part a plane structure part 111 is formed. In a form shown in FIG. 19(F), although a hollow stiffener part 112 shaped in a hexagon as its cross-sectional shape is formed, a plane structure part 113 extends through the inside of the hollow part of the stiffener part 112. In a form shown in FIG. 19(G), a hollow stiffener part 114 shaped in a trapezoid-like quadrangle (a half form of the above-described hollow stiffener part shaped in a hexagon) as its cross-sectional shape is formed, and the stiffener part 114 is disposed only on one surface of a plane structure part 115. Except the examples shown in the figures, various forms can be employed. What type of stiffener sectional shape should be selected may be appropriately decided in accordance with function, mechanical properties, surface formation, etc. required for the panel structure.

In a conventional panel structure comprising stiffeners formed in parallel crosses, crosswise stiffeners cross at a right angle. On the other hand, in the panel structure adjoining FRP structural elements in the present invention, the cross angle of the stiffener parts can be set larger than the right angle. As a result, because the stress concentration of the cross part of the stiffener parts at the time load transmission can be reduced, the panel structure comprising FRP structural elements in the present invention can be increased in structural strength.

Further, in a conventional panel structure comprising stiffeners formed in parallel crosses, a stiffener extended in one direction transmits a load in the same direction, but in the panel structure comprising FRP structural elements in the present invention, because the stiffener parts make a load diverge in a plurality of directions and transmit the diverging loads, the load can be supported efficiently by the whole of the panel structure.

For example, in case where this structure is applied to a floor panel part of a vehicle, of course, a load at the time of front collision or a side collision can be efficiently supported by the whole of the floor panel part, and even at the time of offset front collision or the time operated with an impact locally to a part of the floor panel such as in a side ball collision, as described above, because the FRP structural elements can avoid fatal stress concentration and can transmit a load while making the load diverge, a floor panel having a high structural strength can be obtained.

Figure 20:
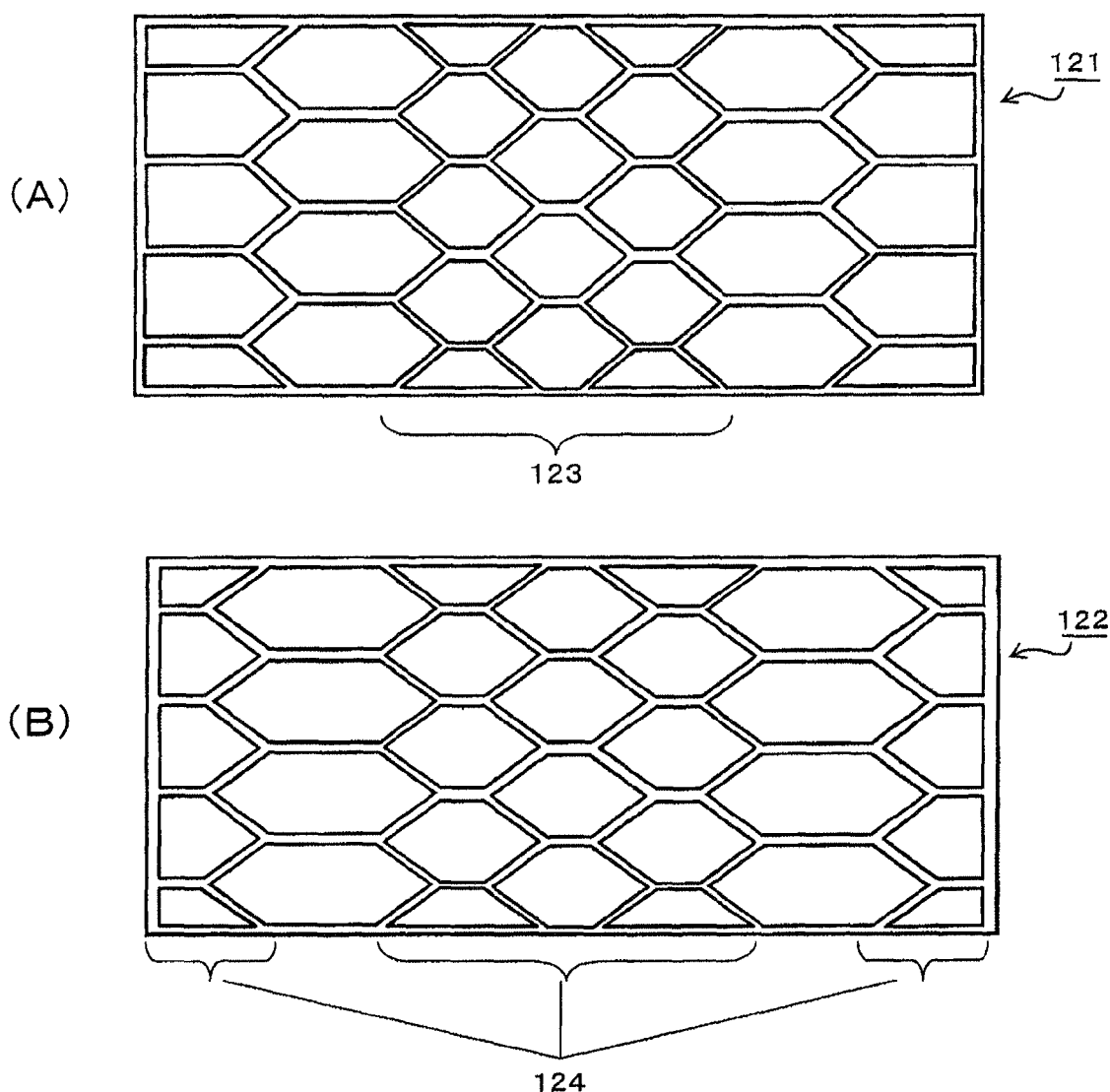
FIG. 20 shows plan views showing other examples of a panel structure part and showing examples giving a height to a density in disposition of stiffeners.

Further, as aforementioned, in the panel structure in the present invention, it is possible that, in the panel structure, a relative height is given to a density in disposition of stiffeners forming the closed loop ridge structures of the FRP structural elements. For example, as shown in FIGS. 20 (A) and (B), in panel structures 121, 122, parts 123, 124 high in density in disposition of stiffeners can be appropriately provided. How the parts high in density in disposition of stiffeners should be provided may be appropriately decided in accordance with functions, mechanical properties, etc. required partially to the panel structure while taking into consideration on lightening in weight of the whole of the panel structure.

For example, in case where this structure is applied to a floor panel part of a vehicle, by making the density in disposition of stiffeners of a part corresponding to a front side of the vehicle high, it becomes possible to attach the attachment parts for an engine or a suspension with the floor securely. Further, by making the density in disposition of stiffeners of a central part of the floor panel high, it becomes possible to realize a structure efficiently supporting a load at the time of side collision, etc.

Figure 21:
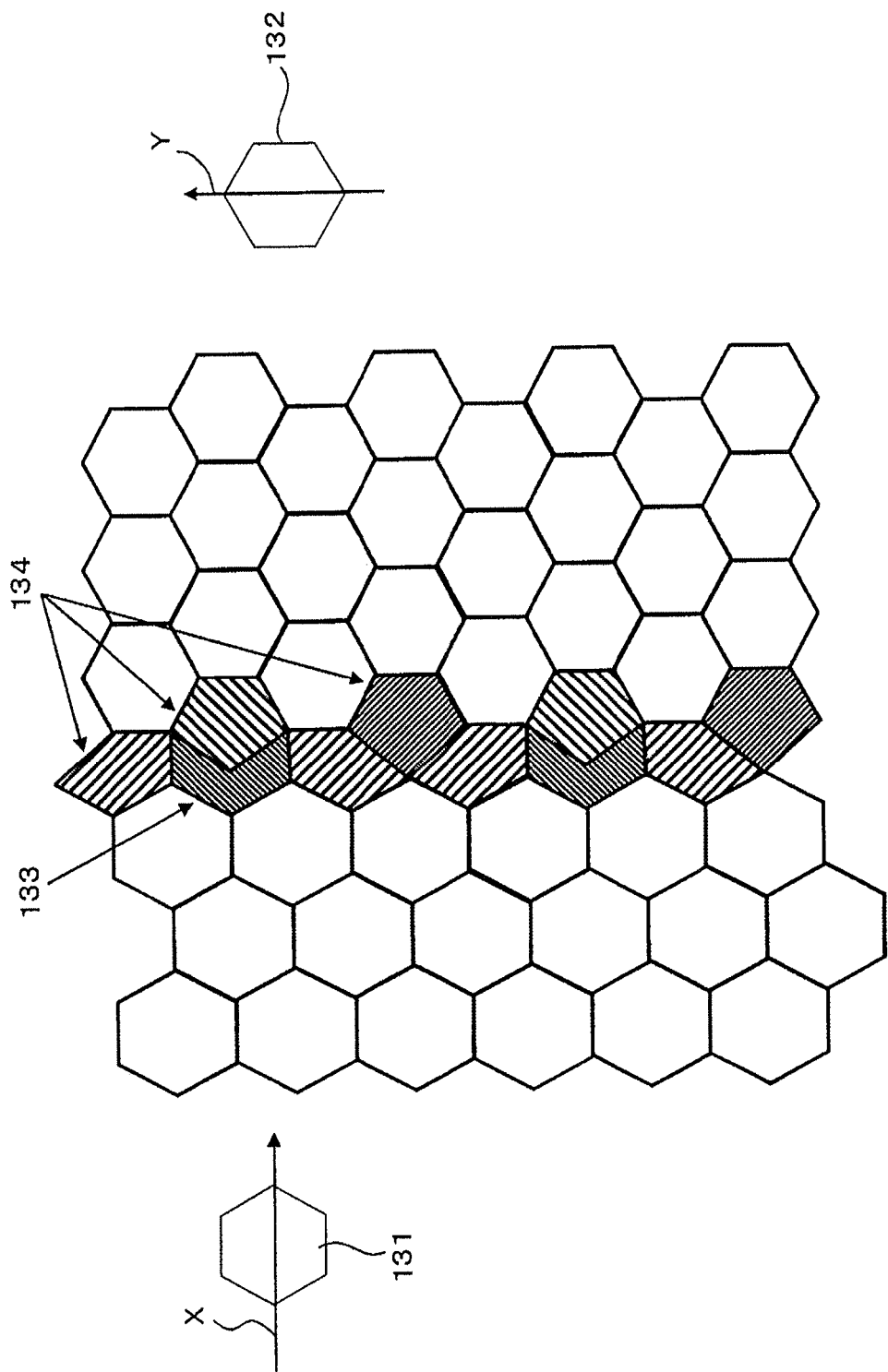
FIG. 21 is a plan view showing a further example of a panel structure part.

Further, in case where a panel structure is formed by adjoining FRP structural elements shaped in hexagons as described above, by interposing different kinds of (different forms of) FRP structural elements on the way of the adjoining, for example, it is possible to change the axial direction of an FRP structural element shaped in a hexagon to be adjoined on the way. For example, as shown in FIG. 21, in case where an FRP structural element 131 shaped in a hexagon having an axial direction X is adjoined and an FRP structural element 132 shaped in a hexagon having an axial direction Y is adjoined, by interposing concave-form hexagon FRP structural elements 133 and pentagon FRP structural elements 134 between both adjoining regions, it is possible to change the axial direction of hexagon FRP structural elements between X and Y directions. It is an effective structure in case where an isotropic property is given to the strength or the rigidity and the direction thereof is desired to be changed on the way, and may be appropriately employed as needed.

Figure 22:
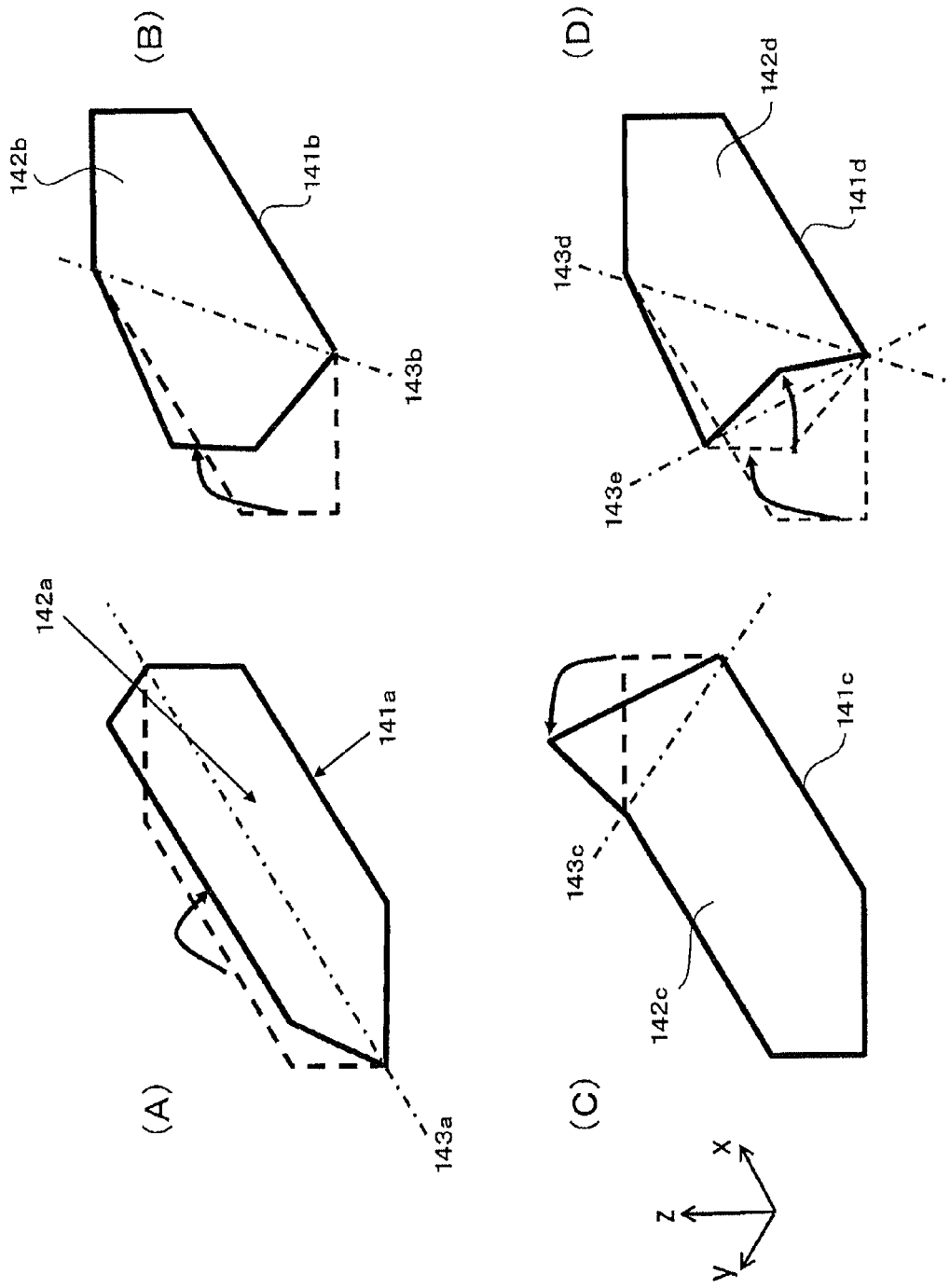
FIG. 22 shows schematic perspective views showing various kinds of examples of bending formation with respect to a panel structure part.

Further, the FRP structural element according to the present invention can be formed in a formation bent along at least one of the polygonal lines of a polygon. For example, as shown in FIGS. 22 (A) to (D), in FRP structural elements comprising stiffeners 141a, 141b, 141c, 141d formed in polygons (in the figure, hexagons) forming ridge lines and plane structure parts 142a, 142b, 142c, 142d, any of polygonal lines in the polygons can be bent along bending axes 143a, 143b, 143c, 143d, 143e (two bending axes of a bending axis (1) 143d and a bending axis (2) 143e in the embodiment shown in FIG. 22(D)). By using such an FRP structural element of a bent form, it becomes possible to form a panel structure part having a relatively complicated shape such as a curved part.

By combining FRP structural elements of various forms, it also becomes possible to integrally form a panel structure 151 as a structure for a vehicle interior having, for example, a shape as shown in FIG. 23. An integrated structure can also be obtained by integrally joining a plurality of those FRP structural elements, and further, depending upon the shape of the whole, it can also be possible to form this panel structure 151 by integral molding. In panel structure 151 as a structure for a vehicle interior, the whole thereof is formed in a monocoque structure integrally formed with a fiber-reinforced resin. On the front side and the rear side of panel structure 151 in the front-rear direction of the vehicle, a front-side bowl-shaped structure part 152 opening toward the rear side and a rear-side bowl-shaped structure part 153 opening toward the front side are formed. These bowl-shaped structure parts 152, 153 are formed using an FRP structural element bent along at least one of polygonal lines of a polygon as aforementioned.

In such a panel structure 151 as a structure for a vehicle interior, for example, by making a structure adjoined with a plurality of FRP structural elements which comprise the aforementioned stiffeners 72, 77 formed in the closed loop ridge structure parts 73, 78 and plane structure parts 74, 79, mainly by the adjoining structure of stiffeners 72, 77, high rigidity and strength (in particular, flexural rigidity and strength) as the whole of panel structure 151 can be ensured, and at the same time, via plane structure parts 74, 79, desired shape and plane formation as the whole of panel structure 151 can be ensured. In particular, because front and rear bowl-shaped structure parts 152, 153 are formed at high strength and high rigidity, against a great impact load applied at the time of front collision, rear collision, etc., it becomes possible to greatly improve safety for a passenger. Further, for example, a vertical bending can be supported by the entire width of the floor part, and against a torsion, a high rigidity can be ensured by the stiffener parts extending obliquely (obliquely relative to the front-rear direction of the vehicle). Further, a compression load in the front-rear direction can be supported by the entire width of the floor part, and against a load from a side direction of the vehicle (for example, an impact load due to side collision), it becomes possible to support the load by dispersing the load over the entire width of the floor part. Furthermore, it is also possible to give an isotropic mechanical property particularly over the whole of the floor part of panel structure 151, and for example, such an isotropic mechanical property can be realized by forming the whole of the floor part in an adjoining formation of hexagon FRP structural elements 71. Further, in case where it is required to give a rigidity distribution partially, it can be achieved, for example, by adequately combining pentagon FRP structural elements 76 and hexagon FRP structural elements 71, further, by adequately combining FRP structural elements having vent forms.

Further, by partially changing the adjoining pitch of hexagon FRP structural elements 71 or pentagon FRP structural elements 76 (concretely, by appropriately incorporating FRP structural elements 71, 76 different in size), it is also possible to change the property partially with respect to a certain specified part of panel structure 151. Furthermore, by well utilizing the buckling behavior of plane structure parts 74, 79, in case where a great impact load is applied, etc., panel structure 151 is not broken at a time over a broad area, but it becomes possible to design the structure in which a partial breakage proceeds in order through the buckling behavior of plane structure parts 74, 79, and it becomes possible to design a desired specification for the panel structure 151 as a structure for a vehicle interior taken into consideration up to the breakage thereof.

By such an integrated structure for a vehicle interior 151 having bowl-shaped structure parts 152, 153, the rigid structure of the vehicle interior can be effectively achieved, and at the same time, the lightness in weight can be ensured by being formed by a fiber-reinforced resin, and further, if the whole thereof is integrally molded, a good productivity, in particular, a mass productivity, and reduction in cost can be achieved.

The structure for a vehicle interior of a passenger vehicle and a manufacturing method thereof according to the present invention are suitable particularly for an electric vehicle, a fuel cell powered vehicle, a hybrid car, etc. in which the freedom in position for mounting a power source for running a vehicle is high.

EXPLANATION OF SYMBOLS

1, 11, 31: structure for a vehicle interior
2: front-side bowl-shaped structure part
3: rear-side bowl-shaped structure part
4: side-wall part
5, 12: keel
5a: inside of keel
6, 13: rib
7: opening part of structure
8, 14: gunnel
15: shell
21: upper mold of cone mold
22: core box
32, 51, 51a, 51b, 51c, 61, 62: subsidiary structure
33, 52, 52a, 52b, 52c: main opening part
34, 53, 53a, 53b, 53c, 63, 64: annular wall
35: curved wall
36, 37, 24, 24a, 24b, 24c: connection wall
38, 39: opening part
40: enlarged part
41: keel
55, 55a, 55b, 55c: cross wall
56: rib wall
65: connection wall
71, 76: FRP structural element
72, 77: stiffener
73, 78: closed loop ridge structure part
74, 79: plane structure part
81, 91: panel structure
82: hexagon FRP structural element
83: pentagon FRP structural element
84: quadrangle FRP structural element
101, 103, 105, 107, 109, 112, 114: stiffener part
102, 104, 106, 108, 111, 113, 115: plane structure part
110: core material
121, 122: panel structure
123, 124: part high in density in disposition of stiffeners
131, 132: hexagon FRP structural element
133: concave-form hexagon FRP structural element
134: pentagon FRP structural element
141a, 141b, 141c, 141d: stiffener
142a, 142b, 142c, 142d: plane structure part
143a, 143b, 143c, 143d, 143e: bending axis
151: panel structure as structure for a vehicle interior
152, 153: bowl-shaped structure part

The invention claimed is:

1. A structure for a passenger vehicle interior, which is a structure for constituting said vehicle interior of a passenger vehicle, said structure being formed in a monocoque structure in which the entire structure from a front side to a rear side of said vehicle interior is integrally formed by a fiber-reinforced resin, said structure has a bowl-shaped structure part which is provided at least on said front side of said structure and which opens toward said rear side, and has a side-wall part formed as a vertical wall that is continuous with said bowl-shaped structure part and extends in a front-rear direction of said structure, at each of both side parts of said structure,
wherein a keel extending in said front-rear direction of said structure at least partially and formed as a vertical wall is provided in a section of said structure including at least said bowl-shaped structure part.

2. The structure for a passenger vehicle interior according to claim 1, wherein a bowl-shaped structure part, which opens toward said front side, is provided also on said rear side of said structure.

3. The structure for a passenger vehicle interior according to claim 1, wherein said keel is formed in said bowl-shaped structure part as a vertical wall extending from a bottom surface to a ceiling surface of said bowl-shaped structure part.

4. The structure for a passenger vehicle interior according to claim 1, wherein a rib extending in a width direction of said structure is provided in said structure.

5. The structure for a passenger vehicle interior according to claim 1, wherein, at least on an upper edge part of said side-wall part among an opening edge part of a structure opening part opened upwardly which is formed by an opening edge part of said bowl-shaped structure part and said upper edge part of said side-wall part that is continuous with said opening edge part of said bowl-shaped structure part, a gunnel extending along said opening edge part of said structure opening part is provided.

6. The structure for a passenger vehicle interior according to claim 5, wherein said opening edge part of said structure opening part is formed in a shape capable of going in and out with a cone mold used for molding of said structure.

7. The structure for a passenger vehicle interior according to claim 1, wherein said bowl-shaped structure part is formed as a supporting part for a load transmitted from a vehicle structure part which is disposed adjacently to and outside said bowl-shaped structure part in said front-rear direction of said structure.

8. A structure for a passenger vehicle interior, which is a structure for constituting said vehicle interior of a passenger vehicle, said structure being formed in a monocoque structure in which the entire structure from a front side to a rear side of said vehicle interior is integrally formed by a fiber-reinforced resin, said structure has a bowl-shaped structure part which is provided at least on said front side of said structure and which opens toward said rear side, and has a side-wall part formed as a vertical wall that is continuous with said bowl-shaped structure part and extends in a front-rear direction of said structure, at each of both side parts of said structure,
wherein said structure for a passenger vehicle interior further has a subsidiary structure connected to said structure for said vehicle interior for supplementing and reinforcing said structure for said vehicle interior, said subsidiary structure has at least an annular wall which has a main opening part opened in a direction toward a front-rear direction of said vehicle and spreading all over a cross section of said vehicle interior and which continuously extends annularly around said main opening part, and has a connection wall which is adjoined to said annular and extends from said annular wall in said front ear direction of said vehicle and which is connected with said structure for said vehicle interior, and the whole of these parts for forming said structure for said vehicle interior is integrally formed by a fiber-reinforced resin.

9. The structure for a passenger vehicle interior according to claim 8, wherein said subsidiary structure includes a rear-side subsidiary structure connected to said rear side of said structure for said vehicle interior.

10. The structure for a passenger vehicle interior according to claim 9, wherein said rear-side subsidiary structure has a curved wall curved and extending along a shape of said structure for said vehicle interior from said annular wall toward a rear side.

11. The structure for a passenger vehicle interior according to claim 10, wherein an opening part is formed at each of both sides of said curved wall in a width direction of said vehicle.

12. The structure for a passenger vehicle interior according to claim 10, wherein a keel, which is a reinforcing vertical wall extending in said front-rear direction of said vehicle, is provided in said structure for said vehicle interior, and said curved wall is integrally joined to said keel.

13. The structure for a passenger vehicle interior according to claim 8, wherein said subsidiary structure includes a front-side subsidiary structure connected to said front side of said structure for said vehicle interior.

14. The structure for a passenger vehicle interior according to claim 13, wherein said front-side subsidiary structure has a cross wall extending across said structure for said vehicle interior in its width direction.

15. The structure for a passenger vehicle interior according to claim 8, wherein said subsidiary structure includes a rear-side subsidiary structure connected to said rear side of said structure for said vehicle interior and a front-side subsidiary structure connected to said front side of said structure for said vehicle interior.

16. The structure for a passenger vehicle interior according to claim 15, wherein annular walls of said rear-side subsidiary structure and said front-side subsidiary structure are integrally coupled by a coupling wall extending in said front-rear direction of said vehicle.

17. The structure for a passenger vehicle interior according to claim 16, wherein said coupling wall forms a hinge attachment part for a wing-type door.

18. The structure for a passenger vehicle interior according to claim 8, wherein said annular wall forms a hinge attachment part for a door.

19. A structure for a passenger vehicle interior, which is a structure for constituting said vehicle interior of a passenger vehicle, said structure being formed in a monocoque structure in which the entire structure from a front side to a rear side of said vehicle interior is integrally formed by a fiber-reinforced resin, said structure has a bowl-shaped structure part which is provided at least on said front side of said structure and which opens toward said rear side, and has a side-wall part formed as a vertical wall that is continuous with said bowl-shaped structure part and extends in a front-rear direction of said structure, at each of both side parts of said structure, wherein at least a part of said structure for a passenger vehicle interior is formed using a panel structure comprising an aggregate adjoined with a plurality of FRP structural elements, and each of said FRP structural elements comprises a fiber-reinforced resin molded material formed in a polygon of a pentagon or a hexagon as a plane shape wherein a stiffener is formed on all sides of said polygon to form a closed loop ridge structure, and an inside of said closed loop ridge structure is formed in a plane structure.

20. The structure for a passenger vehicle interior according to claim 19, wherein said panel structure has a curved part, and said curved part is formed using an FRP structural element bent along at least one of diagonal lines of said polygon.

21. The structure for a passenger vehicle interior according to claim 19, wherein, in said panel structure, stiffeners forming closed loop ridge structures of FRP structural elements adjacent to each other are molded integrally with each other, or joined integrally to each other.

22. The structure for a passenger vehicle interior according to claim 19, wherein, in said panel structure, a relative height is given to a density in disposition of stiffeners forming closed loop ridge structures of said FRP structural elements.

23. A method for manufacturing a structure for a passenger vehicle interior, wherein when a structure constituting a vehicle interior of a passenger vehicle is manufactured, said structure is molded as divided structures divided at a section including at least one of a keel and a rib, and after molding, said divided structures are joined to each other, said structure being formed in a monocoque structure in which the entire structure from a front side to a rear side of said vehicle interior is integrally formed by a fiber-reinforced resin, said structure has a bowl-shaped structure part which is provided at least on said front side of said structure and which opens toward said rear side, and has a side-wall part formed as a vertical wall that is continuous with said bowl-shaped structure part and extends in a front-rear direction of said structure, at each of both side parts of said structure, and wherein a rib extending in a width direction of said structure is provided in said structure.

24. A method for manufacturing a structure for a passenger vehicle interior, wherein a structure for constituting said interior of a passenger vehicle is molded using a cone mold and a core box, said structure being formed in a monocoque structure in which the entire structure from a front side to a rear side of said vehicle interior is integrally formed by a fiber-reinforced resin, said structure has a bowl-shaped structure part which is provided at least on said front side of said structure and which opens toward said rear side, and has a side-wall part formed as a vertical wall that is continuous with said bowl-shaped structure part and extends in a front-rear direction of said structure, at each of both side parts of said structure.

* * * * *